May 16, 1944.  A. J. SYROVY ET AL  2,348,763
POWER TRANSMISSION
Filed Aug. 5, 1941  12 Sheets-Sheet 1
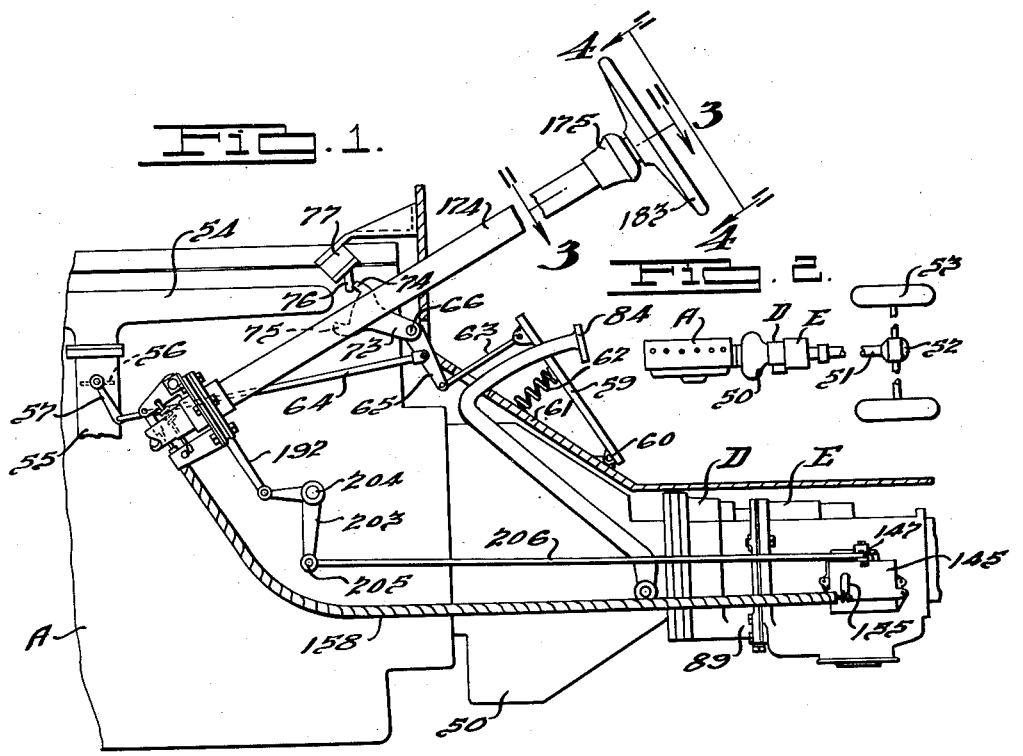
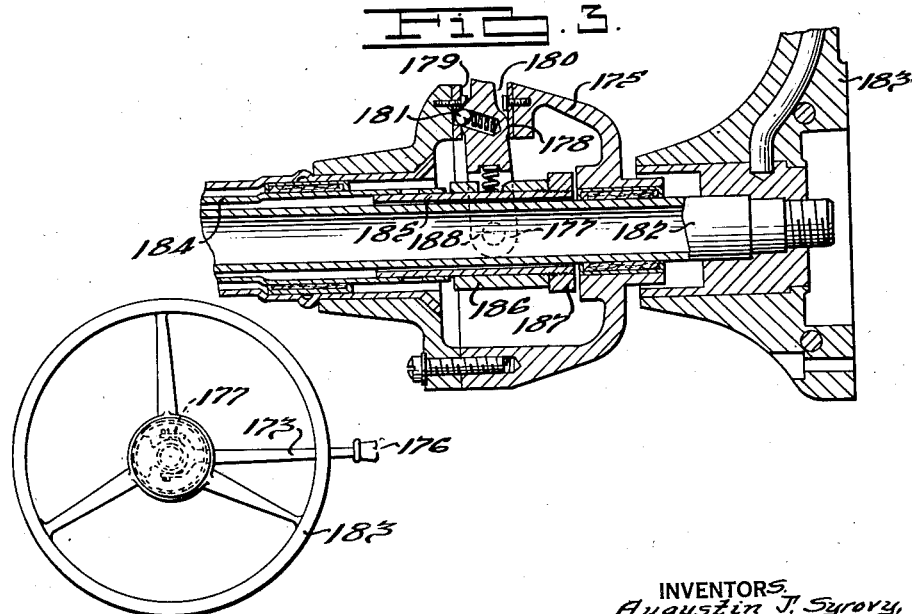
INVENTORS.
Augustin J. Syrovy,
William T. Dunn,
BY Otto W. Schotz.
Harness, Dickey, Pierce & Harris
ATTORNEYS.

May 16, 1944. A. J. SYROVY ET AL 2,348,763
POWER TRANSMISSION
Filed Aug. 5, 1941 12 Sheets-Sheet 2
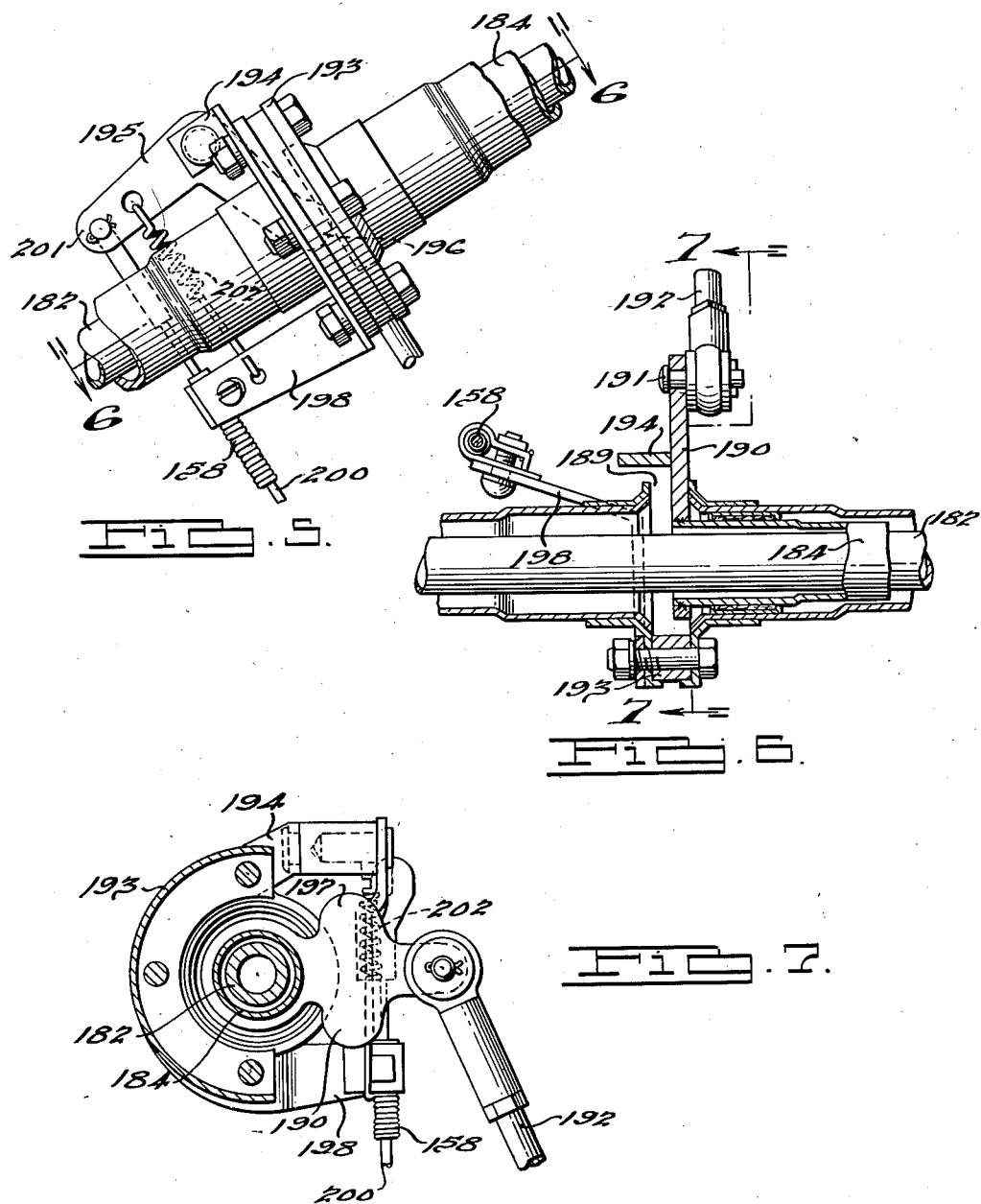
INVENTORS,
Augustin J. Syrovy,
William T. Dunn,
BY Otto W. Schotz.
Harness, Dickey, Pierce & Harris
ATTORNEYS.

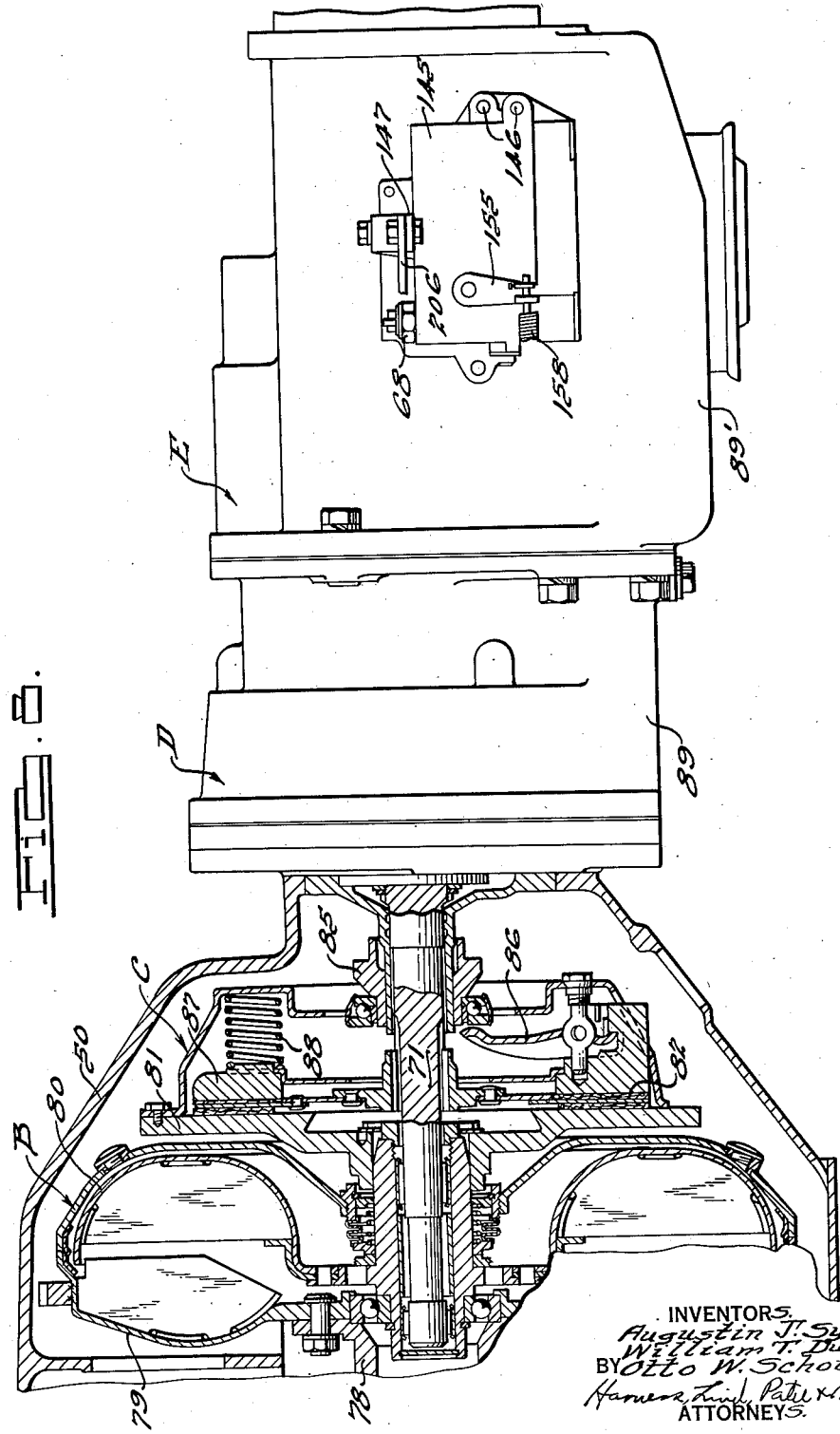

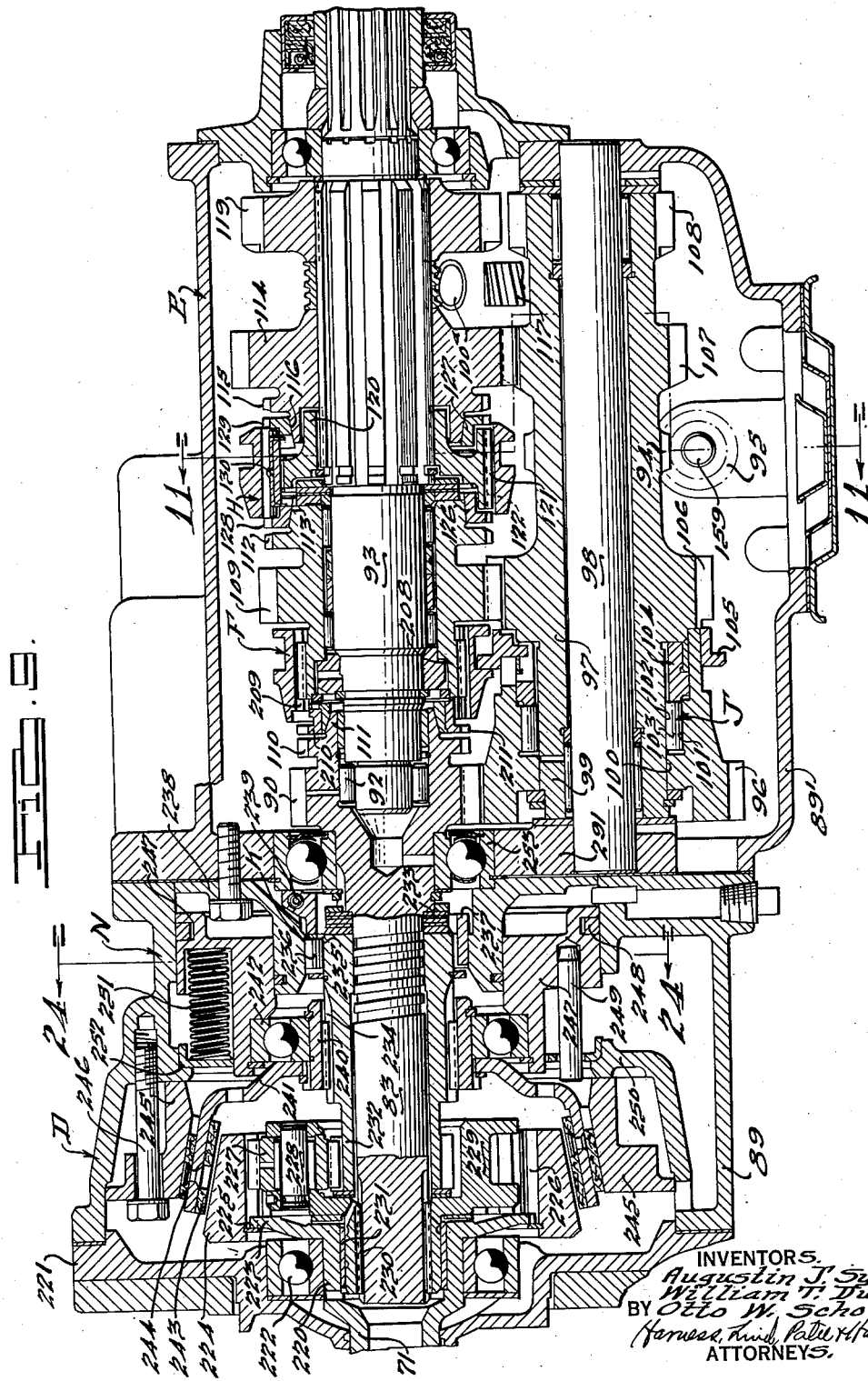

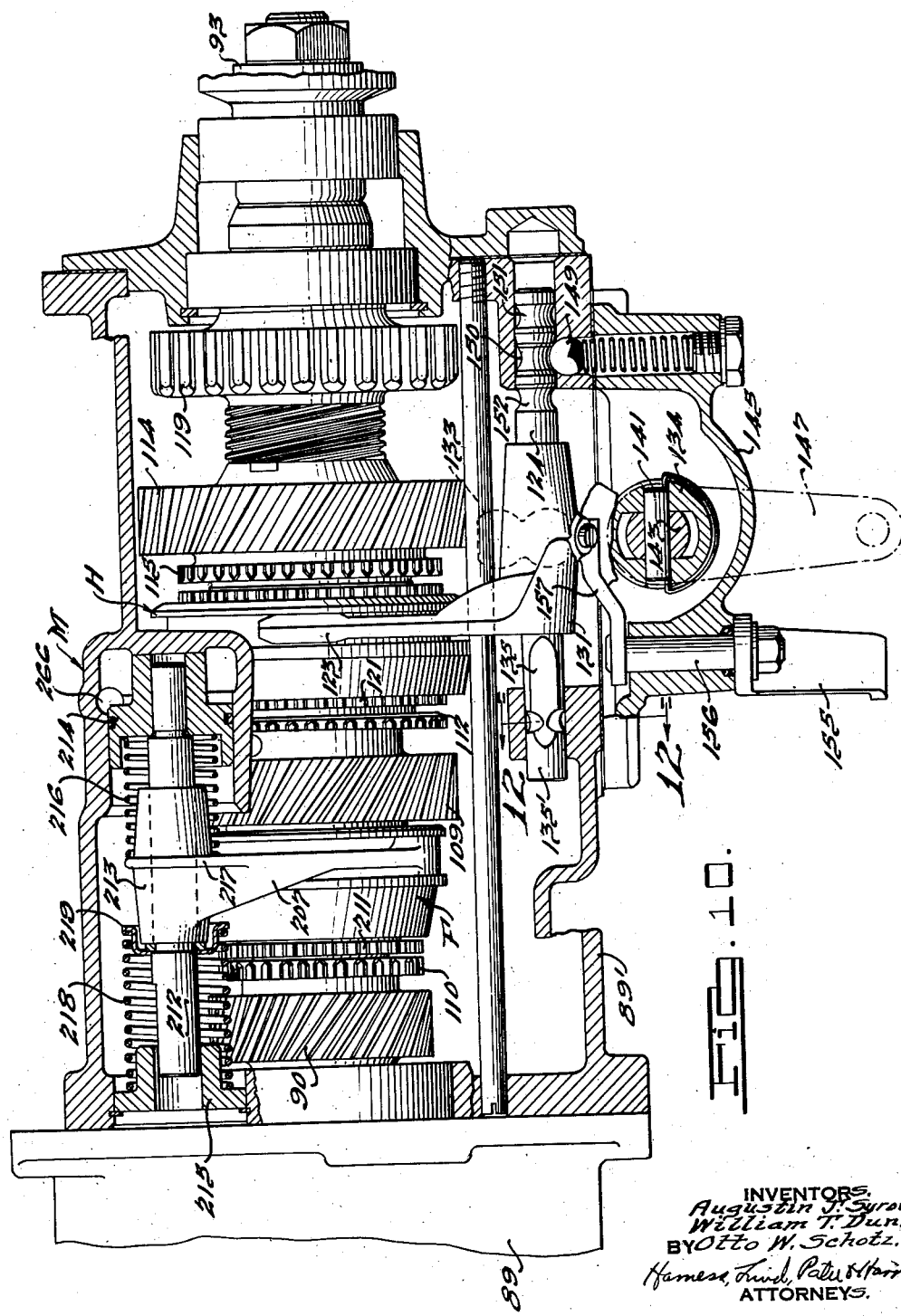

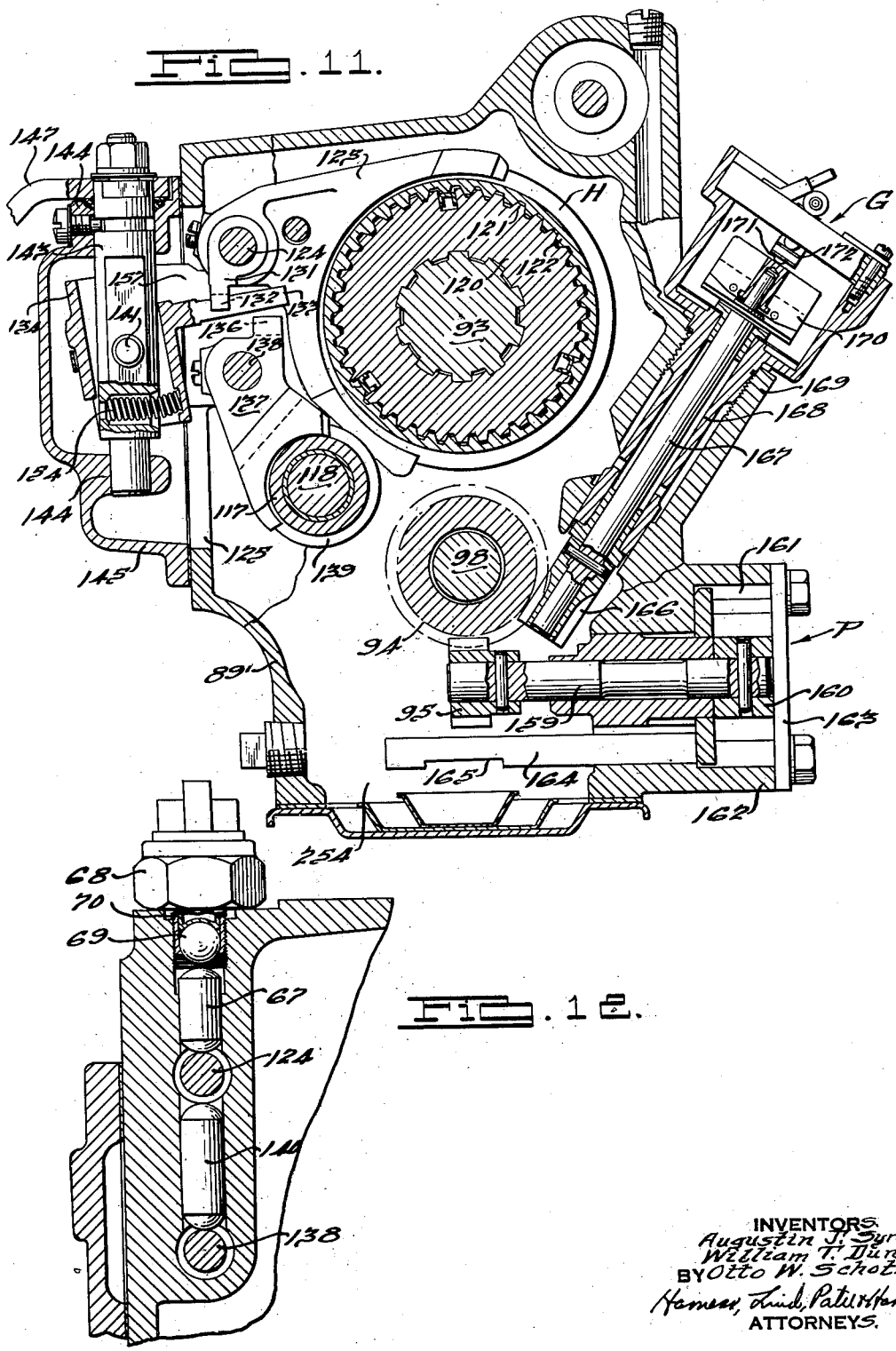

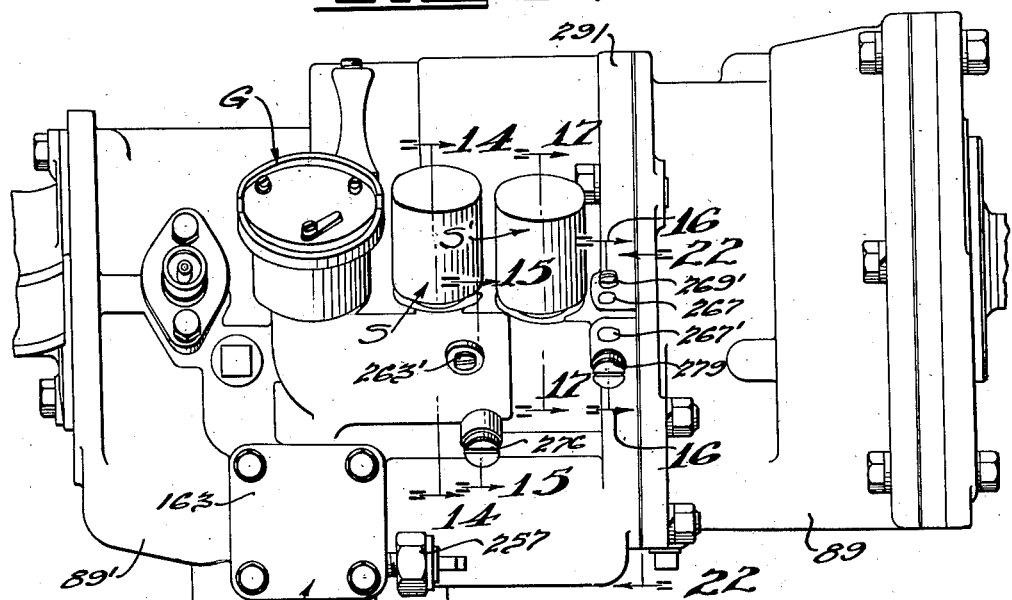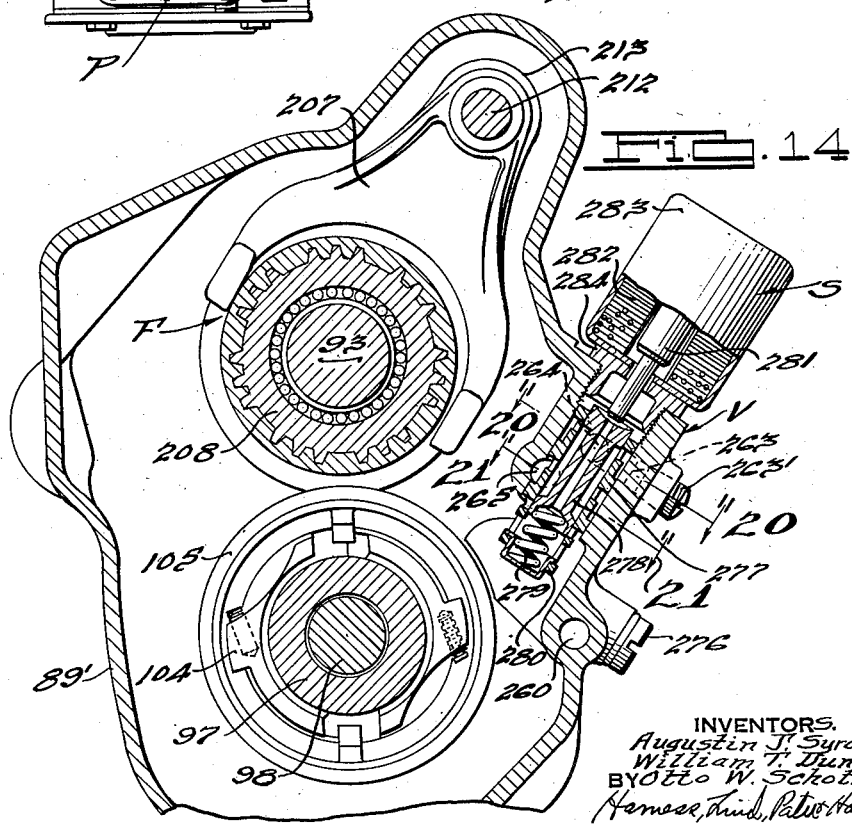

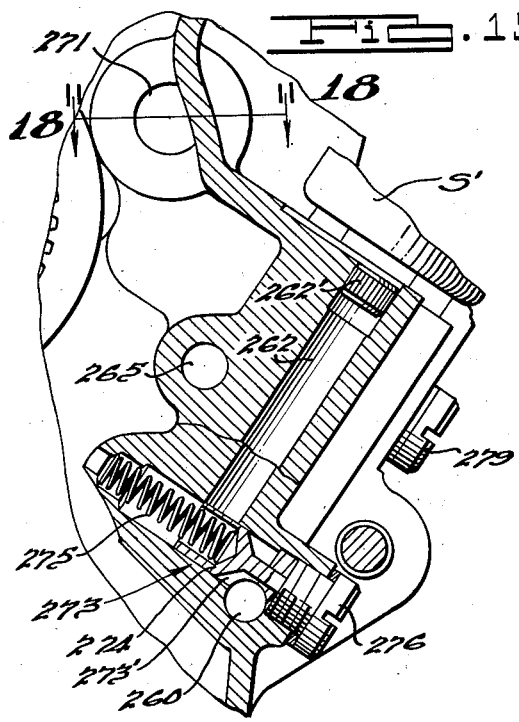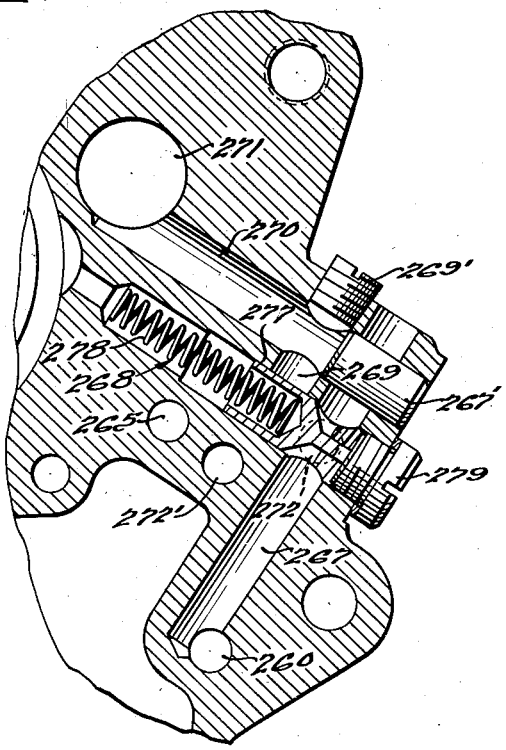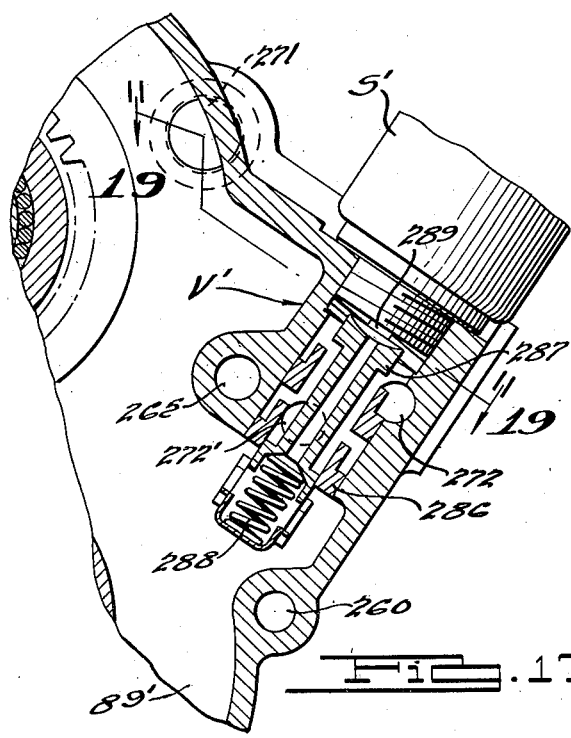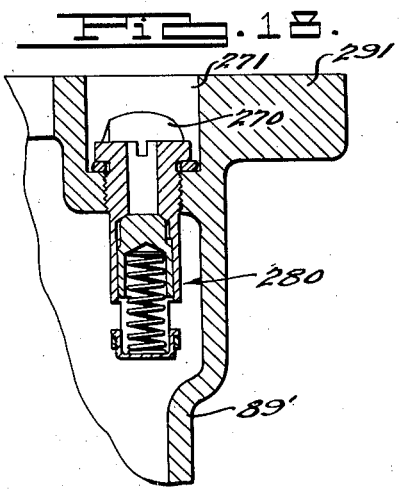

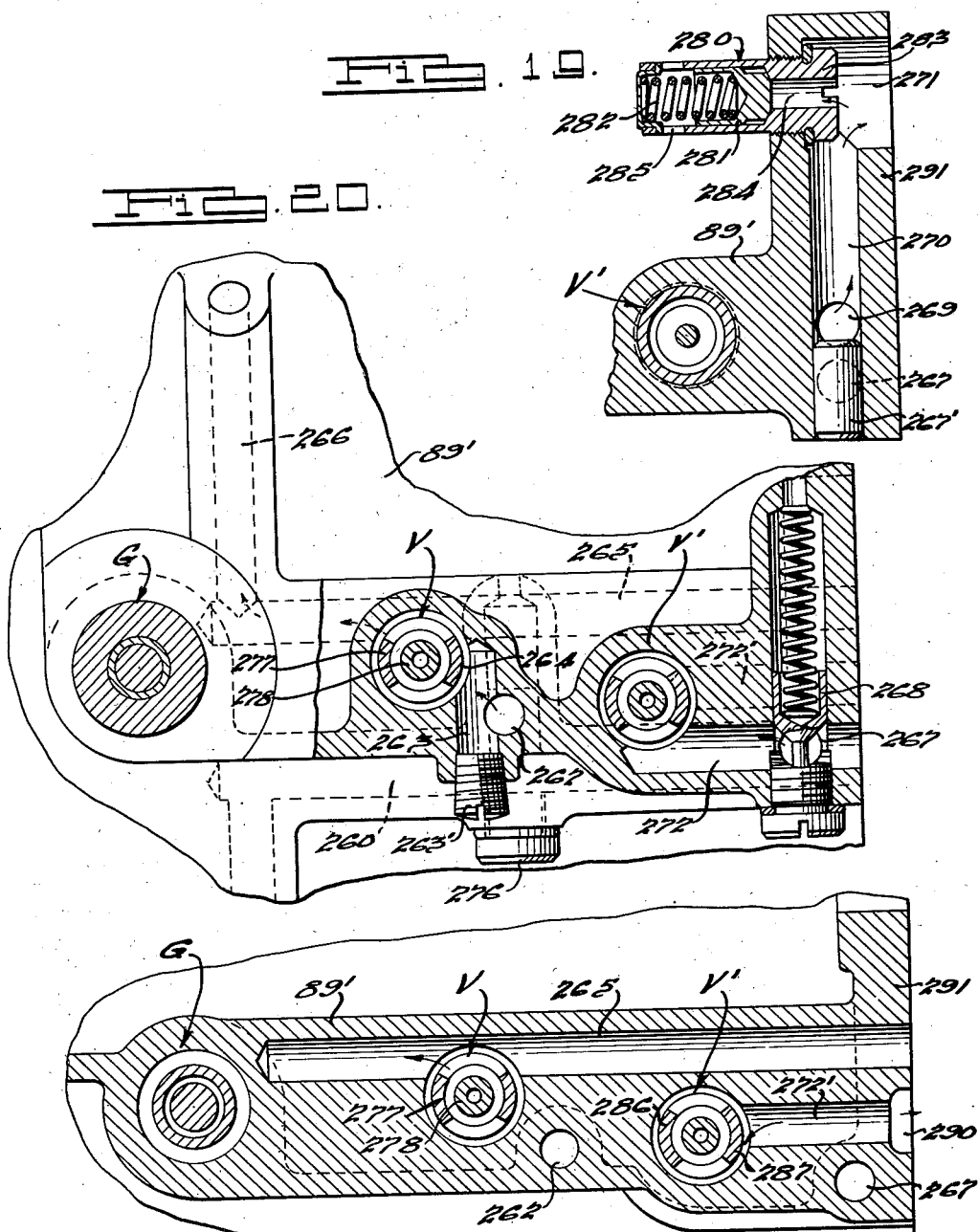

May 16, 1944.　　A. J. SYROVY ET AL　　2,348,763
POWER TRANSMISSION
Filed Aug. 5, 1941　　12 Sheets-Sheet 10
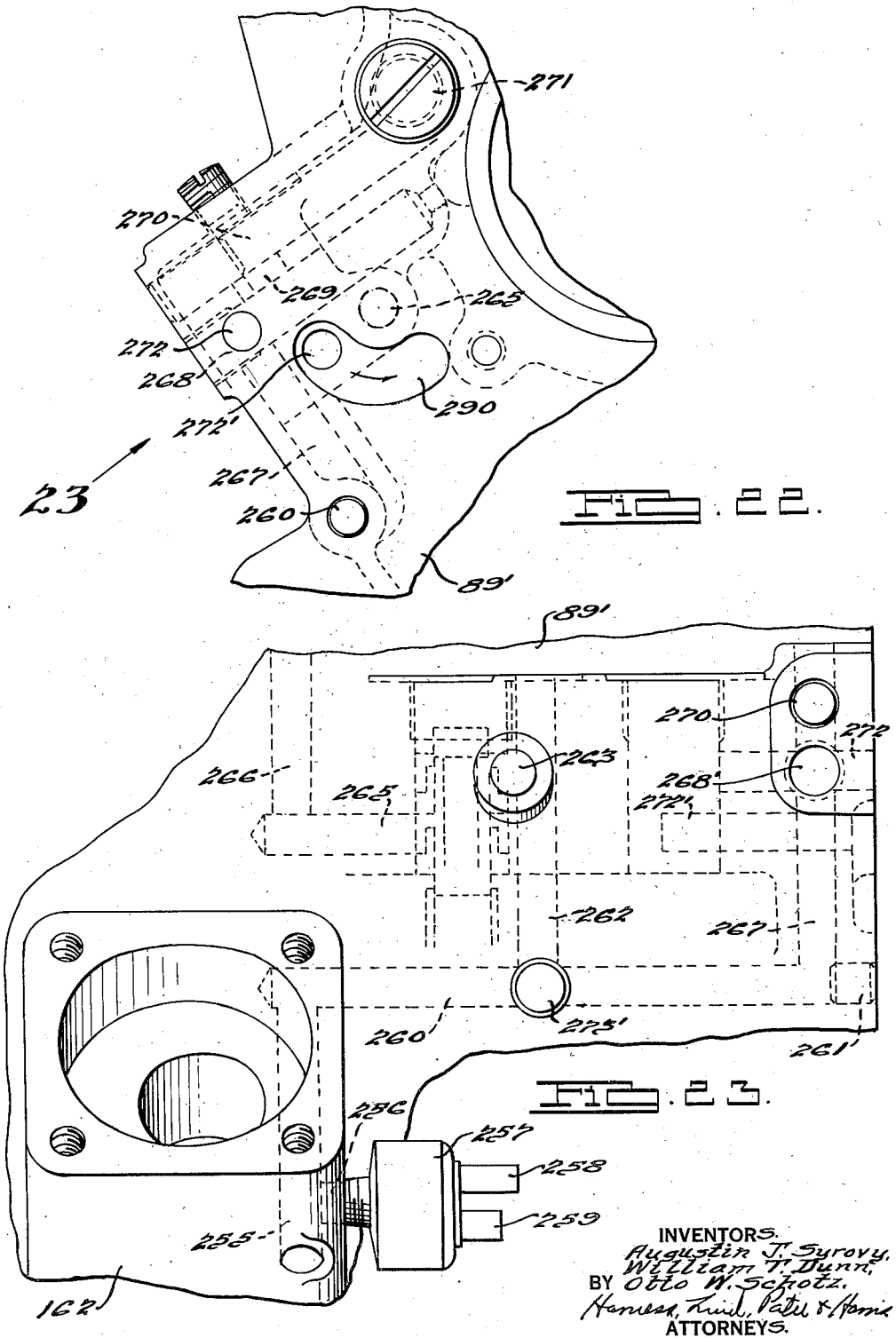
INVENTORS.
Augustin J. Syrovy,
William T. Dunn,
BY Otto W. Schotz.
ATTORNEYS.

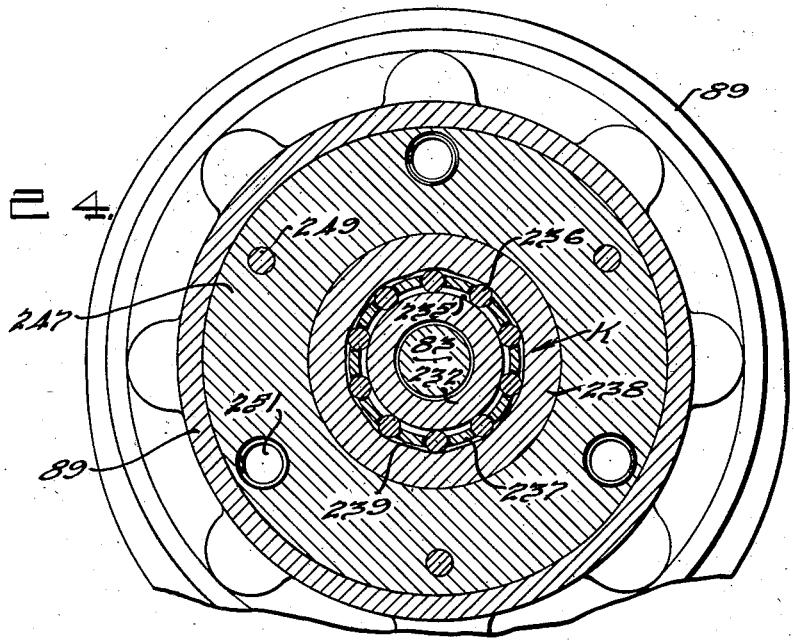
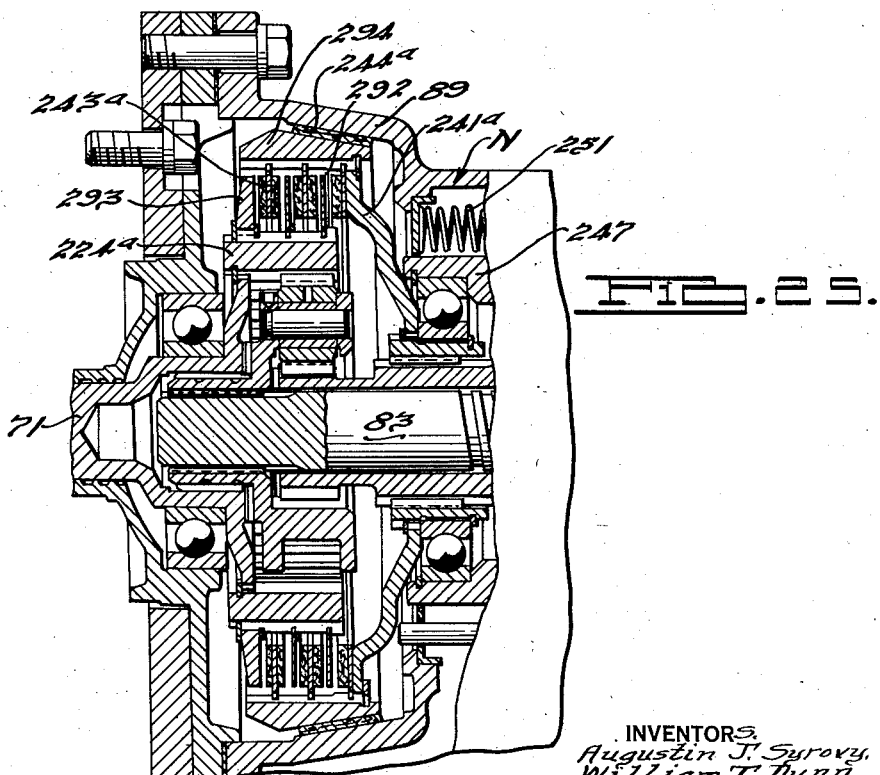

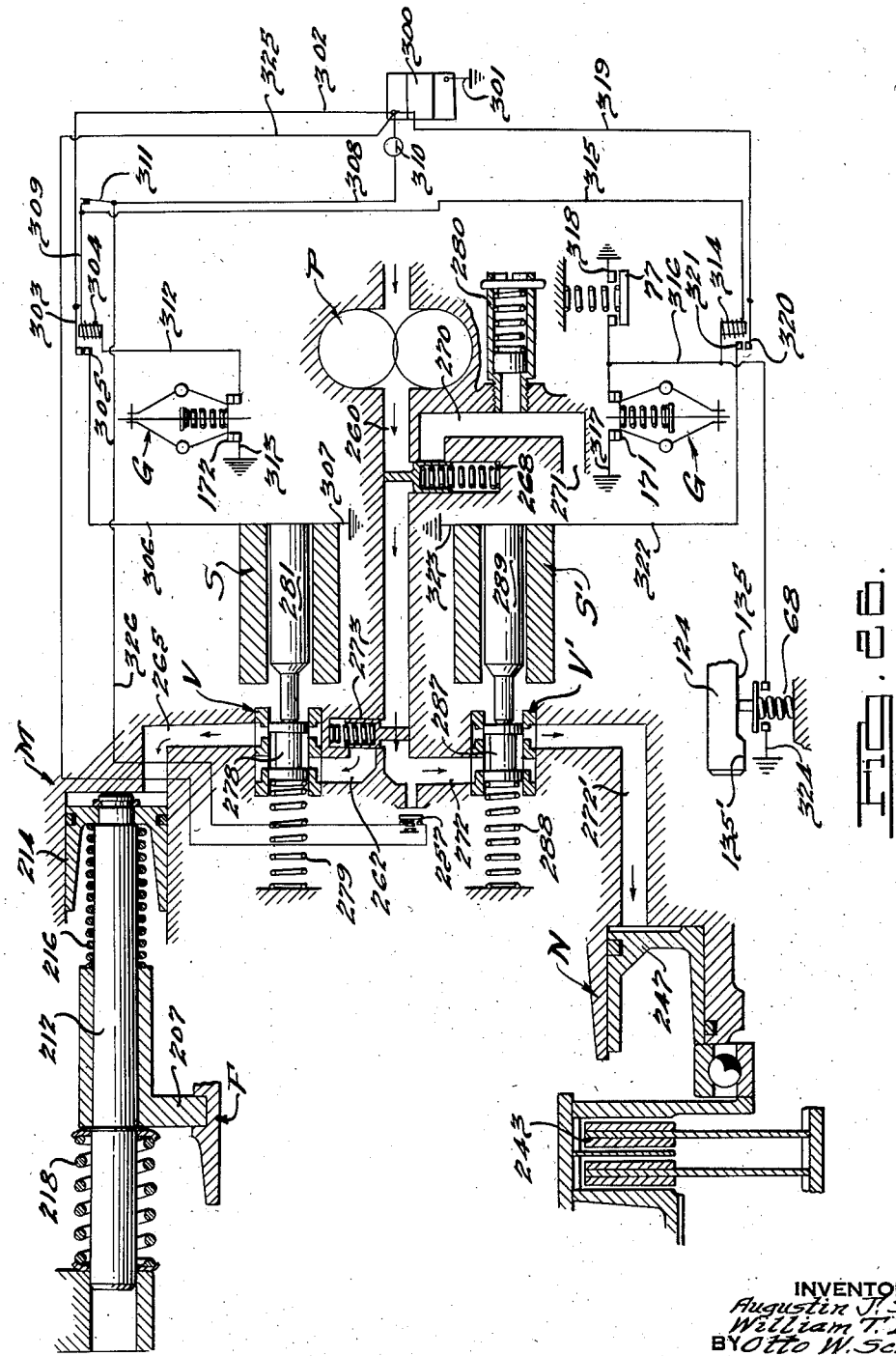

Patented May 16, 1944

2,348,763

UNITED STATES PATENT OFFICE 2,348,763

POWER TRANSMISSION

Augustin J. Syrovy, William T. Dunn, and Otto W. Schotz, Detroit, Mich., assignors to Chrysler Corporation, Highland Park, Mich., a corporation of Delaware Application August 5, 1941, Serial No. 405,530

27 Claims. (Cl. 74—328)

This invention pertains to vehicle power transmissions and particularly to those types wherein the changing of speed ratios is accomplished by power means.

Transmissions of the so-called semi-automatic type, such as that disclosed in the copending application of Carl A. Neracher, et al., Serial No. 335,310, filed May 15, 1940, have gone into wide use and have proved satisfactory except that it has been found necessary under certain driving conditions to shift the transmission into low range (which must be done manually) in order to obtain adequate acceleration. Also, in the aforesaid types of transmissions automatic shift from direct drive to underdrive in either range requires that the engine ignition be cut out for an instant to unload the shift sleeve which feature is regarded as undesirable by some drivers.

In the present transmission arrangement, an additional underdrive unit of the planetary type is disposed ahead of the main transmission and novel power control means is provided whereby manual shifting of the transmission is rendered practically unnecessary, improved acceleration characteristics are imparted to the car and interruption or diminution of the engine ignition is rendered entirely unnecessary.

Accordingly, it is the principal object of the present invention to provide an improved power transmission which will permit operation of the automobile under widely varying driving conditions without necessitating manual operation of the transmission or interruption of the engine ignition.

Another object is to provide an improved hydraulic control system for a power transmission which is simple and foolproof.

An additional object is to provide an electrical control for said hydraulic control system which is simple and easy to service.

A still further object is to provide a transmission affording improved means for changing speed ratios through the medium of two power actuated clutches, one being a friction clutch and the other a toothed clutch. These clutches are operatively related with a pair of gearsets and control means is provided whereby an automatic step-up in driving ratio may be obtained from a low ratio to an intermediate ratio and then to a higher ratio, one of the speed changes taking place during driving and the other taking place upon momentary release of the drive.

Our improved transmission is preferably arranged so that two changes in speed ratio may be obtained automatically in forward drive, thus providing a driving arrangement which does not differ from that in conventional use in its general functions. Both of the speed ratio changes are obtained automatically, one upon the vehicle reaching a predetermined speed, and the other upon release of the accelerator pedal when the vehicle is traveling above a predetermined speed higher than that necessary for the said one shift to take place.

The mechanism is further arranged so that a shift down to a lower speed ratio, for faster acceleration, hill climbing, etc., while the vehicle is traveling above the aforesaid lower predetermined speed may be quickly and smoothly accomplished by depression of the vehicle accelerator pedal to the full extent of its travel, or by other equivalent control means.

It is therefore a further object to provide an improved speed change mechanism wherein one step-up in the driving ratio may be obtained instantaneously upon the attainment of a predetermined vehicle speed, and a second step-up in the driving ratio may be obtained upon momentary release of the driving torque when the vehicle is travelling at a speed in excess of a predetermined speed higher than that at which the first step-up is obtained.

A still further object is to provide a transmission of the aforesaid type wherein an instantaneous "kickdown" to a lower speed ratio from either of two higher speed ratios may be obtained.

A still further object is to provide in a transmission of this type means for obtaining "kickdown" to a lower speed ratio from a higher speed ratio without the necessity of interrupting the drive of the engine.

We have provided an improved drive system incorporating a fluid coupling and kickdown transmission so constructed as to provide great flexibility of car control with very little effort such that nearly all driving may be done without manipulation of clutch pedals or gear shift levers and at the same time affording flexibility of car control best suited to the changing requirements of torque multiplication and other power transmitting characteristics. Our driving mechanism affords improved quietness and smoothness of car operation and facilitates manipulation of the car especially under heavy traffic conditions.

With our transmission it is practicable for the driver to stay in a selected speed ratio setting while stopping, and thereafter obtain rapid car starting accelerations under favorable torque multiplication, and faster ratio boulevard or country drive conditions without operating clutch pedal or gear shift lever.

Other objects and advantages of the invention will become apparent from the following description wherein preferred forms of the invention are disclosed. In the accompanying drawings, reference characters are used to designate corresponding parts referred to below.

Fig. 1 is a side elevational view of the power plant and transmission for a motor vehicle.

Fig. 2 is a plan view somewhat diagrammatically illustrating the power transmission assembly in relation to the vehicle driving ground wheels.

Fig. 3 is a sectional view of the remote control hand shift mechanism taken as indicated by line 3—3 of Fig. 1.

Fig. 4 is a top plan view of the Fig. 3 mechanism taken as indicated by line 4—4 of Fig. 1.

Fig. 5 is an enlarged view of a portion of the Fig. 1 shift apparatus.

Fig. 6 is a detail sectional view taken as indicated by line 6—6 of Fig. 5.

Fig. 7 is a detail sectional view taken as indicated by line 7—7 of Fig. 6.

Fig. 8 is an enlarged side view, partly in section and partly in elevation, showing the Fig. 1 power transmission.

Fig. 9 is a sectional elevational view through the speed ratio changing transmission which is illustrated in elevation in Fig. 8.

Fig. 10 is a sectional plan view of the rear portion of the Fig. 9 mechanism, parts being broken away to illustrate details thereof.

Fig. 11 is a transverse sectional view looking forwardly as indicated by line 11—11 of Fig. 9, showing the transmission portion of the remote shift mechanism.

Fig. 12 is a detail sectional view taken as indicated by line 12—12 of Fig. 10.

Fig. 13 is a detail elevational view of the right hand side of the transmission casing.

Fig. 14 is a detail section taken along the line 14—14 of Fig. 13.

Fig. 15 is a detail sectional view taken as indicated by line 15—15 of Fig. 13.

Fig. 16 is a detail sectional view taken as indicated by the line 16—16 of Fig. 13.

Fig. 17 is a detail sectional view taken as indicated by the line 17—17 of Fig. 13.

Fig. 18 is a detail sectional view taken as indicated by the line 18—18 of Fig. 15.

Fig. 19 is a detail sectional view taken as indicated by the line 19—19 of Fig. 17.

Fig. 20 is an enlarged detail sectional view taken as indicated by the line 20—20 of Fig. 14.

Fig. 21 is an enlarged sectional view taken as indicated by the line 21—21 of Fig. 14.

Fig. 22 is an enlarged sectional view taken as indicated by the line 22—22 of Fig. 13.

Fig. 23 is an enlarged detail looking in the direction of the arrow 23 in Fig. 22.

Fig. 24 is a sectional view taken as indicated by the line 24—24 of Fig. 9.

Fig. 25 is a fragmentary, elevational, sectional view of a modified form of the invention.

Fig. 26 is a diagrammatic view of the transmission control system.

We have illustrated the principles of our invention in connection with a motor vehicle drive wherein the usual engine A transmits its drive through clutching means B, C, within casing 50, the drive then passing through the planetary underdrive transmission D, the helical underdrive transmission E and propeller shaft 51 (Fig. 2) to the differential 52 and thence to the vehicle ground wheels 53 where it is desired to drive the rear wheels according to present day practice.

By preference, the arrangement is such that the drive from the engine passes through a planetary underdrive unit, then through a helical gear underdrive unit so that when both units are operating in highest ratio the car is driven in a direct drive ratio between the engine A and wheels 53. Our arrangement provides such conveniently operable kickdown or shift to a reduction drive from direct that the aforesaid arrangement is practicable thereby obtaining advantages of economy, long life and quietness of operation without the disadvantages of sluggish operation which is especially objectionable in city driving.

The engine A has the customary intake manifold 54 and the carburetor riser 55 containing a throttle valve 56 operable by a lever 57 throughout a range between the illustrated closed throttle position for engine idling and a wide open position. Lever 57 is adjusted by a driver operable accelerator pedal 59 pivotally mounted at 60 on the toe-board 61 to swing downwardly against restoring spring 62 to thrust through the system of pivotally jointed links 63, 64 and connecting lever 65, the latter being pivotally supported at 66.

The throttle operating mechanism is such that movement of pedal 59 throughout its normal range will cause a corresponding adjustment in the valve 56 between its limits of fully closed and wide open positions. When the pedal has been depressed to the wide open throttle position, mechanism about to be described is rendered operable to shift the transmission from direct to underdrive.

The kickdown range of accelerator pedal movement is utilized to effect release of the reaction gear of the planetary underdrive unit D for a quick change from direct to underdrive without necessity of engine ignition interruption. The throttle being open will cause the engine to rapidly speed up as soon as the lower driving ratio becomes effective.

The lever 65 has fastened thereto a second lever 73 directed forwardly to provide spaced fingers 74, 75 in the path of the actuator 76 of the snapswitch 77 which is a control part of the kickdown mechanism. When pedal 59 moves in its kickdown range, finger 75 throws actuator 76 rearwardly to close switch 77, the switch remaining closed until the pedal 59 is fully released, or substantially so, at which time finger 74 restores actuator 76 to the Fig. 1 position to open the switch 77.

We preferably transmit the drive from the engine A to underdrive transmission D through clutch means comprising a fluid coupling B of the kinetic type preferably in conjunction with a releasable clutch C of a conventional design employed to facilitate manual shifts in transmission E, and to accommodate stopping the car in gear without tendency of the coupling B to cause the car to creep especially where the idle is set "fast" (as during winter starting), or where the throttle is accidentally opened.

The engine crankshaft 78 drives the coupling impeller 79 to circulate the fluid in its vaned passages to drive the vaned runner 80 in a manner well known for fluid couplings of the type illustrated. The runner 80 drives the clutch member 81 of the friction clutch C of commercial design. Driven clutch disc 82 is fixed to intermediate drive shaft 71 and is drivingly disengaged by depressing a clutch pedal 84 (Fig. 1) which slides the throwout member 85 forwardly to operate levers 86 to unload driving pressure plate 87, springs 88 loading this plate and engaging the clutch when pedal 84 is released.

Shaft 71 extends rearwardly into the housing 89 of underdrive unit D (Fig. 9) where the drive passes through the planetary unit D and thence to the helical unit E by means of a shaft 83 which is formed with a main drive pinion 90.

Shaft 83 extends rearwardly into the housing or casing 89 of transmission E (Fig. 9) where it is formed with a main drive pinion 90. The drive pinion 90 is hollow and journals, by a bearing 92, the forward end of the transmission driven shaft 93 which may carry the usual propeller shaft braking mechanism (not shown). The drive pinion 90 is continuously meshed with a gear 96 for driving the countershaft cluster 97 rotatable on a countershaft support 98. The cluster 97 has a forward extension 99 journalled at 100 within gear 96 and between these parts 99 and 96 there is provided an overrunning clutch J. The usual speedometer drive gears are shown at 100ª for driving the usual speedometer cable.

The clutch J comprises a driving cylinder clutching member 101 formed within gear 96, and an inner driven cammed member 102 formed on extension 99. Rollers 103 are disposed between clutch members 101 and 102 such that these rollers are wedged to clutch these members together when the gear 96 tends to rotate faster than extension 99 in the direction of forward drive of the car while allowing the extension 99 to freely overrun gear 96. Assuming the usual clockwise direction of driving shaft 83, when looking from the front to the rear, then clutch J engages when the gear 96 tends to rotate counterclockwise faster than extension 99. A cage 104 positions the rollers 103 in proper spacing and a control collar 105 is operably associated with the cage for neutralizing the rollers when the clutch is in overrunning condition. This construction is more completely described in the copending application of Carl A. Neracher et al., Serial No. 272,734, filed May 9, 1939.

The cluster 97 is further formed with reduction gears 106, 107 and reverse gear 108, these three countershaft gears being of relatively decreasing diameter in the order mentioned. Gear 106 is in constant mesh with a gear 109 which is freely journalled on driven shaft 93. The gear 109 has a forward extension carrying a set of external driven teeth slidably fitting internal clutch teeth of the synchronous coupling sleeve F so that this sleeve is, as will be presently more apparent, adapted to turn with transmission output or driven shaft 93 but may slide forwardly from its Fig. 9 position relatively to the driven shaft. Gear 109 has a rearward extension formed with a set of clutch teeth 112 and a friction cone clutch member 113 and drive pinion 90 also has a rearward extension formed with a set of external clutch teeth 110 and a friction cone clutch member 111.

The gear 107 is constantly meshed with a low speed gear 114 freely journalled on driven shaft 93 and having a forward extension formed with clutch teeth 115 and cone clutch member 116. The reverse gear 108 is adapted to mesh with a reverse idler gear 117 when the latter is slid rearwardly on its countershaft 118 (Fig. 11). At such time the idler 117 also is meshed with a gear 119 fixed on the driven shaft 93.

The arrangement is such that shaft 93 may be selectively clutched at the will of the driver with gears 114 and 109, the control preferably comprising a manual remote shift of any suitable type and construction. The operation of clutch sleeve F is, on the other hand, automatic in its operation of clutching driving shaft 83 with gear 109 or for disconnecting these parts. The manual clutching control comprises the following mechanism.

Fixed to driven shaft 93 is a hub 120 (Fig. 11) formed with external teeth 121 slidably engaged with the internal teeth 122 of the shiftable clutch sleeve H adapted for forward and rearward shift by a yoke 123 fixed to a longitudinally extending shift rail 124 disposed to one side of shaft 93 adjacent the side opening 125 of casing 89'.

Synchronizing blocker rings 126, 127 are respectively disposed between gears 109, 114 and hub 120 and are driven with hub 120 with slight rotative clearance. These blockers have cammed teeth 128, 129 having a pitch circle the same as that of sleeve teeth 122 and teeth 112 and 115 and they are adapted to frictionally engage the clutching members 113 and 116 respectively. If desired, energizing springs 130 may be provided between the blockers to lightly urged them into engagement with cones 113 and 116 respectively so that the blocker teeth 128, 129 are misaligned with the sleeve teeth 122 thereby preventing shift of sleeve H as long as the parts to be clutched are rotating at different speeds. The synchronizing blocker rings are more fully described and claimed in the copending application of O. E. Fishburn, Serial No. 180,840, filed December 20, 1937.

When sleeve H is moved forwardly, teeth 122 engage the cammed ends of blocker teeth 128 thereby urging the blocker under pressure engagement with cone 113 to synchronize gear 109 with shaft 93 (clutch C being released during manual shift of sleeve H to facilitate the clutching action). Then the blocker 126 will rotate slightly relative to hub 120 to permit the sleeve teeth 122 to pass through blocker teeth 126 to engage teeth 112 to positively clutch shaft 93 with gear 109. The rearward shift of sleeve H to clutch with teeth 115 of gear 114 is synchronously effected under control of blocker 127 in the same manner.

The shift yoke 123 is provided with a boss 131 (Figs. 10 and 11) through which rail 124 extends, this boss having a slot 132 adapted to be engaged by an inwardly extending shift finger 133 carried by a trunnion member 134. The finger 133 is also adapted to engage a slot 136 of a yoke 137 fixed to the reverse shift rail 138 which is disposed parallel to and below rail 124. The yoke 137 engages the collar portion 139 of the shiftable reverse idler gear 117. Rails 124 and 138 are interlocked by a plunger 140 (Fig. 12) to prevent their simultaneous displacement. The rail 124 also engages a plunger 67 which in turn engages the operating elements of a switch 68 to be described later on. It will, however, be noted that the rail has a flat portion 135 (Fig. 10) which engages the plunger at all times except when the rail is shifted to low speed position whereupon the relatively high forward portion 135' thereof engages the ball 69 and closes the switch.

The trunnion member 134 is rockably mounted by means of a pin 141 on a rockshaft 143 rotatably carried in the bosses 144 of a cover 145 secured by fasteners 146 to the opening 125 of casing 89'. The shaft 143 is rockable on an axis disposed at right angles to the rails 124 and 138 and has a lever 147 fixed to its upper end outside of the cover. A spring pressed ball detent 149 yieldingly maintains rail 124 in neutral, forwardly (to clutch sleeve H with teeth 112) or rearwardly (to clutch sleeve H with teeth 115) by engagement of this detent ball with the rail recesses 150, 151 and 152, respectively. The reverse rail 138 has similar positioning means (not shown).

The upper surface of the finger 133 is engaged by a lever 157 carried by a shaft 156 (Fig. 10) having a lever 155 mounted thereon outside of the cover 145. A Bowden wire 158 is connected with the lever 155 and the arrangement is such that when the wire is pulled, the lever 157 is actuated to push downwardly on the finger 133 thereby rocking the trunnion 134 about the pin 143 against the spring 154 and engaging the finger with the slot 136 of yoke 137, at the same time disengaging finger 133 from slot 132 of yoke 123. When the finger 133 is engaged with yoke 137, rockshaft 143 may be rotated to shift the reverse idler gear 117 into mesh with gears 108 and 119 and similarly, when finger 133 is engaged with the yoke 123, the rockshaft may be rotated to shift the clutch sleeve H into driving engagement with either the teeth 115 or the teeth 112 thereby to establish low or high range drive. The remote control mechanism for actuating the lever 147 and the Bowden wire 158 will now be described (see Figs. 1 and 3 to 6).

A shift lever 173 is carried by the vehicle steering column, generally indicated by the numeral 174.

The lever 173 is carried directly by a casing 175 having separable sections mounted on the steering column 174. The said lever has a knob 176 on its outer end and a forked inner extremity 177 disposed within the casing 175. Provided on the lever 173 adjacent its forked end is a ball-shaped enlargement 178 which is disposed between wear plates 179 mounted on the opposite side walls of an arcuate slot 180 formed in the casing 175 through which the lever 173 extends. The enlarged portion 178 of the control lever has a bore in which a spring pressed detent ball 181 is disposed. Detent ball 181 is adapted to engage in an aperture formed in the lower wear plate 179 when the lever 173 is centrally located with respect to the opposite ends of the slot. The steering column generally indicated at 174 includes an outer tube on which the casing 175 is mounted and an inner tubular steering shaft 182 which is provided with a steering wheel 183 at the top end thereof as is conventional in the art. The steering shaft 182 extends longitudinally of the steering column and is centrally located with respect to the longitudinal axis thereof.

A tubular shaft 184 extends longitudinally of the steering column and is axially slidably and rotatably supported by the column structure. Mounted in the upper open end of the tubular shaft 184 is a sleeve 185 which is welded or otherwise suitably secured thereto and which extends beyond the upper extremity of this shaft. A collar 186 is concentrically mounted on the portion of the sleeve 185 which extends beyond the shaft 184 and is detachably and non-rotatably held thereon by a nut 187 threaded on the upper end portion of the sleeve as shown in Fig. 3. The collar 186 is provided with diametrically opposed bosses in which are formed holes for receiving bolts 188 which fasten the apertured end portions of the fork 177 to the collar. The bolts or pins 188 pivotally attach the lever to the bosses and the enlarged portion 178 of the lever serves as a fulcrum about which the lever may be oscillated in a vertical plane to shift the shaft 184 axially of the steering column. The shaft 184 may be rotated about its axis which is coincident to the longitudinal axis of the steering column by swinging the lever 173 about the axis of the steering column and during this movement of the lever the enlarged portion 178 thereof slides freely on the bearing surfaces provided by the wear plates 179 which line the walls of the slot 180.

At the bottom of the steering column the tube 174 thereof is provided with a slot 189 through which a lever 190 extends. This lever is welded to the lower end of the tubular shaft 184 as illustrated in Fig. 6 and is connected by means of a pin 191 with an operating rod 192.

Partly surrounding the slot 189 is a housing structure 193 which has a tab 194 on which is pivoted a bellcrank lever 195, the latter having a rounded end portion 196 which bears against the enlarged portion 197 of the lever 190. On the opposite side of the steering column the housing structure 193 has a depending bracket 198 which supports the upper end of the Bowden cable structure 158. The flexible, motion transmitting cable 200 of the Bowden cable structure is connected with the lower leg 201 of the bellcrank 195 and a spring 202 is connected between the bellcrank lever and the bracket 198 in such manner that the bellcrank lever continuously urges the shaft 184 upwardly of the column 174.

The rod 192 is connected with one leg of a second bellcrank lever 203 pivoted at 204 on the block of the engine A, the other leg of said bellcrank lever being pivotally connected at 205 with an operating rod 206 which is pivotally connected at its rearward end with the shift lever 147. The opposite end of the motion transmitting cable 200 of the Bowden cable structure 158 is connected with the selector lever 155 as shown in Fig. 1.

It will therefore be understood that the manually operable shift lever 173 is capable of swinging movement about the axis of the steering column in two paths, the said paths being disposed in parallelism one below the other. In shifting the ratio establishing mechanism in casing 89' the lever 173 may be rocked upwardly of the steering column which shifts the shaft 184 axially downwardly of the steering column thereby rocking the bellcrank 195 about its pivot which in turn, through the medium of the Bowden cable structure, swings the selector lever 155 clockwise of Fig. 1 thereupon effecting downward movement of the trunnion 134 against the force of the spring 154 to disengage the shift finger 133 from the slot 132 and engage it in the slot 136.

The lever 173 is then adapted to be swung in its upper path of movement. Swinging of the lever in a counterclockwise direction as viewed in Fig. 4 will cause the bellcrank lever 203 to be swung in a clockwise direction, this in turn, through the medium of the operating rod 206, causing the shift lever 147 to be swung clockwise of Fig. 10 whereupon reverse idler gear 117 will be shifted.

Counterclockwise swinging of lever 173 in its lower path of movement will effect shift of the coupling sleeve H into engagement with clutch teeth 115 thereby establishing low-speed ratio setting of the transmission, the finger 133, of course, being engaged with the slot 132. Clockwise swinging of the lever 173 will effect shift of sleeve H into high-speed ratio setting, the teeth 112 being engaged.

The countershaft cluster 97 also includes a gear 94 which engages a gear 95 carried on the drive shaft 159 of a pump P (Fig. 11). The pump is preferably of the well known "Gerotor" type and has an inner driving toothed rotor 160 engaged with an outer driven toothed rotor 161, the two being enclosed in a housing portion 162 provided with a cover 163. The driving rotor has one less tooth than the driven rotor thus providing a compressing chamber. An inlet pipe 164 having an opening 165 leads from the oil sump to the suction side of the pump and the pressure side thereof is connected to the operating pressure system of the transmission as will be presently described.

The gear 94 also engages a gear 166 carried by the drive shaft 167 of a speed responsive governor mechanism G. The governor G is enclosed in its own housing which has a stem portion 168 threadedly engaged in the portion 169 of the housing 89' as illustrated in Fig. 11. The governor is of the centrifugal type and has a pivoted weight mechanism generally designated at 170 which is adapted to move upwardly into contact with a switch operating member 171 at predetermined speed of the vehicle. At a higher speed, a second switch operating member 172 is engaged. Inasmuch as the details of the governor mechanism G are not important to the invention, any suitable type of speed responsive mechanism being suitable, further description will be omitted, it being deemed sufficient to state that the governor is preferably constructed and arranged in such manner that the switch operating arms 171 and 172 will be actuated upon acceleration of the vehicle in high range at 7 M. P. H. and 15 M. P. H. respectively.

Referring again to Figs. 9 and 10, it will be seen that the clutch sleeve F is shiftable by means of a shift yoke 207 under the influence of a fluid pressure cylinder M. The sleeve F is slidably carried on a hub portion 208 of gear 109 and has internal teeth 209 which are adapted to engage the teeth 110 formed on a drive pinion 90 under control of a blocker member 210. The latter has teeth 211 which are adapted to assume blocking and non-blocking positions relatively to the teeth 209, the blocker 210 having a friction drive connection with the cone portion 111 of the pinion 90 and a lost motion drive connection with the hub portion 208.

The arrangement is such that the sleeve F is blocked from forward shift to engage the teeth 110 by the blocker teeth 211 whenever the gears 90 and 109 are rotating asynchronously. Upon these gears becoming synchronized, the blocking teeth will be rotated out of blocking position and the sleeve teeth 209 will be permitted to pass therethrough to engage the teeth 110. For a more complete explanation of the function and structure of this blocking mechanism, reference may be made to the aforesaid Neracher et al. application, Serial No. 335,310.

The yoke 207 is carried on a piston rod 212 which passes through a boss 213 formed on the yoke. The rod has a piston 214 fixed on its rear end and the front end thereof is slidable in a guide block 215. A spring 216 disposed between the piston 214 and a shoulder 217 formed on boss 213 permits the piston to move through its power stroke in advance of movement of the yoke should the sleeve F be blocked against shift by the blocker teeth 211. Movement of the piston to compress the spring 216 stores up energy which is dissipated in shifting the sleeve F after it is unblocked.

A second spring 218 bears on the guide block 215 and on a retainer 219 carried by the rod 212 and acts to disengage the sleeve F and return the parts to their Fig. 10 positions upon venting of the motor M. The spring 218 is preferably of 35 lbs. pressure while the spring 216 is preferably of 20 lbs. pressure. The former must exert sufficient pressure to disengage the sleeve F under slight driving load as well as return the piston and rod to the Fig. 10 position upon venting of the motor M, while spring 216 need only be of sufficient strength to engage the sleeve F after the rod and piston have been moved by hydraulic pressure to compress spring 218. It will be noted that there is a leader and follower relation between the rod 212 and the yoke 213, the former always acting in advance of the latter on the pressure stroke.

When the sleeve F is in the Figs. 9 and 10 low speed position, the drive from pinion 90 is transmitted to the cluster 97 through overrunning clutch J and then to the shaft 93 by way of gears 106, 109 or gears 107, 114 depending upon the position of clutch sleeve H. It will thus be seen that the mechanism in casing 89' provides means for driving the shaft 93 at four different speed ratios relatively to the shaft 83 depending upon the positions of sleeves F and H. When reverse gear 117 is engaged, a two-speed reverse drive is available, the sleeve F being effective in reverse as well as forward speed if desired.

The underdrive mechanism in casing 89 will now be described.

As will be seen from Figs. 9 and 24, the rear end of the shaft 71 is formed with a bell-shaped portion 220 which is supported in a housing plate 221 by a bearing 222 and an annular portion 223 which carries an annulus gear 224. The teeth 225 of the annular portion 223 mesh with the teeth 226 of the annulus gear and the latter teeth also mesh with the teeth of a plurality of planet gears 227 rotatably carried by axles 228 on carrier 229. The carrier is splined on the shaft 83 at 230, a bushing 231 rotatably separating the shaft 71 therefrom.

The planet pinions 227 mesh with a sun gear 232 which has a rearwardly extending control portion. This portion extends rearwardly into abutting relation with a thrust washer 233 and has spline teeth 234 and a cylindrical portion 235 which forms one element of an overrunning roller brake device K. The latter includes rollers 236 held in spaced relation by a carrier 237. An annular member 238 is bolted to the casing 89' as shown in Fig. 9 and forms the inner wall of a hydraulic cylinder N. The member 238 is provided on its inner periphery with a plurality of cams 239 which cooperate with the rollers 236 to permit the sun gear 232 to overrun the member 238 in a clockwise direction of rotation while preventing overrunning between these parts in a counterclockwise direction. A suitable spring 239 is provided for urging the rollers into lock-up position in one direction as is well known in the art.

Splined on the teeth 234 for sliding movement relatively thereto is a throwout member 240. Fixed to this member by suitable snap ring retaining means is a clutch spider 241 and a release bearing 242. The spider 241 is of bell shape and has inner and outer friction lining elements 243 and 244 riveted thereto. The lining 243 is adapted to frictionally engage the outer surface of the annulus gear 224 upon forward shift of the member 240 thereby to clutch the sun gear 234 and annulus gear 224 together, thus clutching up the planetary gearset for 1 to 1 ratio drive.

The outer lining 244 is adapted to frictionally engage a brake member 245 bolted internally of the casing 89 by bolts 246 in response to rearward shift of the throwout member 240. When the spider 241 is in contact with the brake member 245 rotation of the sun gear 232 in either direction of rotation is resisted and the shaft 83 will be driven from the shaft 71 at a reduced speed ratio through the planetary gearing. Also, upon coasting of the vehicle, the shaft 71 will be driven by the shaft 83 at an overdrive ratio, thus there will be no "free wheeling" of the vehicle so far as the underdrive unit D is concerned, the drive being a two-way drive at all times.

The capacity of the friction brake means is necessarily less than that required to hold the torque transmitted in underdrive ratio because of space limitations. This is, however, not important because the sun gear is held from reverse rotation during underdrive by the overrunning roller brake K. The chief function of the friction brake is to prevent free wheeling on coast and as the coast load is much less than the driving load, the friction brake is adequate for this purpose.

The hydraulic motor N includes a piston 247 of annular shape which is reciprocable in the cylinder formed by the member 238 and the inner periphery of the casing 89. Suitable sealing rings 248 are provided and a plurality of pins 249 carried by the piston engage the casing portion 250 to prevent rotation of the piston.

A plurality of compression springs 251 are disposed between the piston 247 and a retaining washer 252 which abuts a shoulder formed in the casing as shown and act to urge the piston rearwardly to the underdrive position as illustrated in Fig. 9. A bearing 253 mounts the rear end of shaft 83 in the casing 89'.

Pressure fluid admitted to cylinder N by means to be described will cause piston 247 to move forwardly, compressing springs 251 and shifting spider 241 forwardly to disengage it from brake member 245 and engage it with the annulus gear 224. The bearing 242 permits rotation of the spider relatively to the piston at all times.

Referring now to Figs. 11 and 13 to 23, inclusive, the hydraulic system of the transmission will be described.

Lubricating oil from the sump 254 of the casing 89' is delivered under pressure from the pressure chamber 161 of pump P into a pressure line or passage 255 (Fig. 23). Tapped into the side of the pump housing is a short passage 256 which connects with a hydraulic switch 257. The latter is of the well known plunger type (shown diagrammatically in Fig. 26) and has terminals 258, 259 which are adapted to be connected by the switch plunger at all times when there is pressure in line 255.

The passage 255 connects with a longitudinally disposed passage 260 closed by a plug 261 at its forward end. From passage 260, a passage 262 leads upwardly (Figs. 20 to 23) of the casing and is plugged at its top end by a plug 262'. A transverse passage 263, plugged by a screw-threaded plug 263', connects passage 262 with the direct speed clutch control valve V by means of a port 264. As can be seen from Fig. 15, a restriction valve 273 is disposed between passages 260 and 262, the valve comprising a plunger 274 slidably positioned in a short bore 273' and urged outwardly by a compression spring 275 against a screw plug 276. The latter is adjustable to regulate the pressure necessary to open the passage 262 to the passage 260 which function will be described later.

The valve V is one of the two main control valves of the transmission and consists of a ported sleeve 277 pressed into a suitable bore as shown and a plunger 278 which is urged upwardly by a spring 279 carried by a cap 280 fixed to the lower end of the sleeve. The spring 279 urges the plunger 278 upwardly to open the valve thereby establishing communication between port 264 and passage 265 and the plunger is adapted to be moved downwardly to close the valve by the plunger 281 of a solenoid S. The latter also includes a coil 282 enclosed by a casing 283, the whole assembly being mounted on the casing 89' by a screw-threaded fitting 284 which engages the valve bore.

The passage 265 which leads from valve V is sealed at its forward end by the rear end of casing 89. At its rear end, it connects with an upwardly directed passage 266 which leads directly into the cylinder of the direct speed motor M.

Forwardly of the valve V the passage 260 connects with an upwardly directed passage 267 (Figs. 16, 19, 20, 21 and 23). This passage is plugged at its top end by a plug 267' which also plugs a passage 270 directed transversely inwardly of the casing. The passage 267 leads to the main pressure relief valve 268. This valve has a plunger 277 urged outwardly by a spring 278 against an adjusting plug 279. A short passage 269, plugged at 269', connects the valve with the passage 270 which leads into the chamber 271 of the lubrication relief valve 280 (Figs. 18 and 19). This valve regulates the pressure supplied from pump P for lubricating the underdrive unit D, and includes a plunger 281 urged outwardly by a spring 282 to seat against an internal shoulder formed in a plug 283. The latter is adapted for adjustment to regulate the pressure maintained by the valve as is usual in the art. The fluid flowing in passage 270 will flow through passage 284 and unseat the plunger 281 when the pressure has reached the desired value (approximately 6 lbs. per square inch) and spill into the sump through a passage 285. From chamber 271 the fluid passes into the casing 89 at a point (not shown) just inwardly of the member 238 (see Fig. 9) which forms the inner wall of the cylinder N. The lubrication fluid is thus directed into the mechanism of the overrunning brake K and is distributed around the parts of the underdrive unit.

A passage 272 leads from passage 267 (Figs. 16, 17 and 20) into valve V' which controls the action of the underdrive motor N. The valve V' is identical with the valve V and includes a sleeve 286 in which is slidable a plunger 287, a spring 288 urging the valve to open position and a plunger 289 of a solenoid S' being adapted upon energization thereof to close the valve.

Fluid flowing through the valve V' leaves the valve through a passage 272' which connects with an arcuately shaped chamber 290. The chamber 290 is formed in the forward wall 291 of the casing 89' and this chamber is in communication with a passage (not shown) formed in the member 238 (Fig. 9) which leads through the latter into the cylinder of motor N in rear of the piston 247.

Referring now to Fig. 25 which illustrates a modification of the underdrive unit D, it will be seen that the structure is substantially identical with that shown in Fig. 9 except that a plate type of friction clutch has been substituted for the cone type. This form of the invention has been found advantageous when the transmission is to be used with the larger engines with consequent increased torque. The annulus gear 224ª has spline teeth on its outer periphery for the reception of a plurality of metallic plates 292. The forward plate 293 is relatively thick and is staked to the gear 224ª by suitable snap rings. The spider 241ª carries an annulus 294 which has a friction brake lining 244ª on its outer side and is provided with internal splines which carry a series of clutch plates 243ª. The latter are provided with suitable friction lining and are adapted to frictionally engage the plates 292, 293 upon forward movement of the piston 247. The brake lining 244ª is adapted to engage the inside surface of the casing 89 under the influence of the spring 251 when pressure is off in motor N to thereby provide reaction for the underdrive.

The arrangement illustrated in Fig. 25 provides greater capacity both by reason of the greater diameter of the clutch and brake elements as well as by the increased area of the clutch linings.

Fig. 26 shows the hydraulic and electrical control circuits of the transmission in diagrammatic form. The various control instrumentalities have been slightly rearranged to simplify the wiring; the operation, however, is not changed. The governor controlled switches 171, 172 have, for example, been shown as though actuated by separate governors, although but one governor mechanism is used, as heretofore explained. It is desired to point out, however, that two separate governors could be used if desired.

It may be seen that (from the diagram) the vehicle battery 300 is connected to ground on the vehicle frame through a conductor 301. The other side of the battery is connected by a wire 302 with one terminal 303 of a relay 304. The other terminal 305 is connected by wire 306 with the field coil of solenoid S which is also connected to ground through wire 307.

The field coil of relay 304 is connected to battery by wires 308 and 309, this circuit including the ignition switch 310 and a switch 311 which is adapted for manual operation by the driver. The relay is connected to ground through wire 312, speed responsive switch 172 and wire 313. Energization of relay 304 causes engagement of terminals 303, 305 and energization of solenoid S.

In a similar manner, solenoid S' is controlled by a relay 314 which is connected to one side of the switch 311 by a wire 315 and to ground by wire 316 which is grounded through wires 317, 318 or 324 closing either the speed responsive switch 171, the accelerator pedal switch 77, or the rail operated switch 68. The solenoid S' is connected to battery through wire 319, switch terminals 320, 321 and wire 322, and is grounded by wire 323.

The hydraulically actuated switch 257 is connected to the battery through wire 325 and to the hot side of the switch 311 through wire 326. It will thus be seen that when switch 311 is closed, as it is during all normal driving, relays 304 and 314 will be energized at low speeds (when both speed responsive switches 171, 172 are closed) through both the hydraulic switch 257 and the ignition switch 310 which are connected in parallel. Therefore, if the ignition switch is turned off prematurely when the car is rolling to a stop, the relays 304 and 314 will still be energized so long as there is pressure in the hydraulic system, or in other words, so long as the vehicle is moving with the transmission in gear. This prevents the transmission from getting into an undesired locked-up or no-back condition in which the driver cannot manipulate the controls. Such condition frequently arises in connection with transmissions employing an overrunning clutch in the line of drive and especially when the car tends to roll backwards down hill when the shift lever is set for forward drive. With the switch 257 in the circuit, premature cutting of the ignition while the car is moving will not effect the transmission control circuit and lock-up is prevented as well as undesired cyclic operation of the valves V and V'.

The restriction valve 273 performs an important function in that it prevents undesired pressure drops in one part of the hydraulic circuit while another part is doing work. The main pressure relief valve 268 is set (with the particular piston sizes used in this embodiment) to maintain a pressure of 45 lbs. per square inch, in the passage 260. The pump P is of sufficient capacity to maintain the valve 268 open during most driving conditions and therefore fluid for lubrication is furnished to passage 270, the lubrication pressure relief valve being set to blow off at approximately 6 lbs. per square inch.

The restriction valve is interposed between the main fluid pressure passage 260 and the passage 262 which feeds valve V and is set to maintain a minimum pressure of 35 lbs. per square inch in passages 260, 272 at all times as well as to prevent motor M from venting while the cylinder of motor N is filling. For example, assume that the vehicle is being driven in high range at a speed in excess of 7 M. P. H. (which is the speed at which the switch 171 is preferably set to open), then valve V' will be open and motor N will be under pressure, the clutch 243 being engaged. When the car speed reaches 15 M. P. M., switch 172 opens and valve V opens admitting fluid to motor M. If some means were not provided to maintain pressure in passages 260, 272, the pressure therein would drop while motor M was filling and slippage of clutch 243 would result. Then too, let us assume that the vehicle is being accelerated in kick-down ratio, the switch 77 having been closed to vent motor N and it is desired to return to direct drive. Upon opening of switch 77 valve V' will open and motor N will fill. The plunger 274 of valve 273 will then move outwardly under influence of the spring 275 and seal the passage 262 thereby preventing a momentary drop in pressure in motor M which might cause the sleeve F to disengage and clash upon the subsequent build-up in pressure.

The operation of the transmission as a whole will now be described.

Let it be assumed that the vehicle is at rest with the ignition switch 310 off and the manually operable shift lever 173 in neutral position. If the ignition switch is now turned to "on" position, relays 304 and 314 will be energized, switch 311 being closed, as it is for all ordinary driving, and solenoids S and S' will be energized through the respective relay operated switches. Energization of solenoid S will cause the plunger 281 thereof to move downwardly thrusting the valve plunger 278 downwardly against the spring 279 to thereby shut off communication between the fluid passages 262 and 265. Similarly, energization of solenoid S' will cause the plunger 289 thereof to thrust the valve plunger 287 downwardly against the spring 288 thereby cutting off communication between the passages 272 and 272'.

The engine A is then started in the usual manner which causes pump P to deliver fluid under pressure into the main fluid delivery passage 260 and when the pressure has built up sufficiently, valve 268 will operate to permit fluid to flow into lubrication passage 270 as well as into the passages 262 and 272 but as valves V and V' are closed, motors M and N will not be effected.

The driver may now manipulate the transmission into forward driving setting by releasing clutch C through depression of the pedal 84 and swinging the manual shift lever 178 in a clockwise direction while holding it in its lower path of movement. This latter action will, through the intermediary of the linkage 192, 206, etc., effect shift of the manually controlled sleeve H forwardly to clutch the shaft 93 to the gear 109. Inasmuch as there is no pressure on in either of the hydraulic motors, the spider 241 of the forward underdrive mechanism D will be in its Fig. 9 position with the brake lining 244 in engagement with the brake member 245 and the direct clutch sleeve F will be in its Fig. 9 position, which position leaves the cage of overrunning roller clutch J free to lock up the rollers in driving position.

Upon release of the clutch pedal 84, clutch C will be engaged but the vehicle will not necessarily be driven so long as the engine A is idling because of the slippage in the fluid coupling B. Upon depression of the accelerator pedal 59, engine A will speed up and the impeller 79 of the fluid coupling will transmit an increased torque to the runner 80 which will cause the vehicle to be driven forwardly.

The transmission under these conditions is in underdrive ratio in both the forward box D and the rear box E. Shaft 71 drives the annulus gear 224 of the planetary gearset and shaft 83 is driven at a reduced speed relatively to the shaft 71 by means of the planet carrier 229, the sun gear 232 being held against its backward rotational tendency by the overrunning roller brake K. Shaft 93 is likewise driven at a reduced speed with respect to the shaft 83, the drive being through the pinion 90, gear 96, overrunning clutch J, gear 106, gear 109, sleeve H and hub 120.

Should the accelerator be released while the vehicle is being driven in this speed ratio (which corresponds to low speed ratio in conventional automobiles), the vehicle will free wheel because of the overrun permitted at the overrunning clutch J.

When the speed of 7 M. P. H. is reached, governor mechanism G operates to open the switch 171, thus de-energizing the relay 314. It will be noted under the conditions described the switches 77 and 68 are both open, thus when the switch 171 opens, relay 314 has no connection to ground and is therefore de-energized. De-energization of the relay 314 will cause the switch terminals 320, 321 to open, thus de-energizing solenoid S' whereupon the spring 288 will immediately thrust the valve plunger 287 upwardly to open passage 272' to communication with the main fluid pressure supply passage 260 by way of passage 272. Fluid under approximately 45 lbs. per square inch pressure will flow into the cylinder of motor N and piston 247 will be moved forwardly to disengage the lining 244 from the brake member 245 and engage the clutch lining 243 with the conical clutch surface of the annulus gear 224. The planetary gearset is now locked up in 1 to 1 ratio drive, the sun gear being clutched to the annulus gear and being driven forwardly at the speed thereof as is permitted by the overrunning brake mechanism K. Thus, a step-up in the transmission driving ratio is ordinarily effected at 7 M. P. H. and it should be noted that this step-up is accomplished during driving and without the necessity of any action on the part of the driver such as releasing the accelerator pedal.

The vehicle will remain in this driving ratio which corresponds roughly to second or intermediate speed in conventional vehicles at speeds above 7 M. P. H. and if the accelerator pedal is released below a speed of 15 M. P. M., free wheeling of the vehicle will take place through the overrunning roller clutch J.

The step-up to direct drive takes place at any speed above 15 M. P. H. in response to momentarily releasing the accelerator pedal 59. When the speed of 15 M. P. H. is reached, governor mechanism G opens switch 172 which breaks the connection to ground for the relay 304 thereupon causing solenoid S to be de-energized. This in turn permits the spring 279 to thrust the valve plunger 278 of valve V upwardly to open the passage 265 to the passage 262 which leads from the main fluid pressure supply passage 260 to the restriction valve 273. The piston 214 of the motor M immediately moves forwardly, the restriction valve 273 operating to maintain predetermined fluid pressure in the supply passages to the motor M as above described, the forward movement of the piston 214 compressing the shift spring 216 and the return spring 218. The sleeve F, however, is not shifted under these circumstances because of the leader and follower lost motion connection between the piston rod 212 and the yoke 207, the sleeve being blocked against shift by the blocker teeth 211 which, under these circumstances, are in blocking position because of the fact that the shaft 83 is rotating faster than the shaft 93.

Release of the accelerator pedal 59 will now permit the engine driven shaft 83 to fall off in speed and when it reaches a speed substantially synchronous with the speed of the shaft 93, the blocker 210 will be rotated out of blocking position to permit the teeth 209 of the sleeve F to pass through into engagement with the teeth 110 of the pinion 90 upon forward shift of the sleeve F which will take place through the action of the spring 216 which was previously compressed by forward movement of the piston 214.

Depression of the accelerator pedal will now cause the vehicle to be driven forwardly in direct drive, the shafts 71, 83 and 93 all rotating at the same speed, the planetary gearset being locked up in 1 to 1 ratio drive and sleeves F and H being in their forward direct drive position.

The vehicle will continue to be driven in direct drive ratio so long as the speed thereof is in excess of 15 M. P. H. If the speed drops below 15 M. P. H. and above 7 M. P. H., the governor mechanism G will close the switch 172 energizing relay 304 and causing switch contacts 303, 305 to close, whereupon solenoid S will be energized and valve V will be closed cutting off the supply of pressure to motor M and venting the same into the casing as will be clear from Fig. 14. As soon as motor M is vented, spring 218 will be effective to move the yoke 207 rearwardly to disengage sleeve F from the clutch teeth 110. However, there will be driving thrust on the teeth 209, 110 which will prevent release of the clutch F under the influence of the spring 218 until the driving load is reduced to a point at which the spring 218 can effect shift of the sleeve. This will occur preferably at some speed slightly about 7 M. P. H. or at a higher speed if the direction of torque transmission through the transmission is reversed either by depression of the accelerator pedal (if the vehicle is coasting) or by releasing the accelerator pedal (if the vehicle is driving). It should be noted that when the vehicle is in direct drive, there is no free wheeling, the overrunning clutch J being locked out of the driving train because of the engagement of the sleeve F and the clutch spider 241 being frictionally engaged with the annulus gear 224 thereby providing a two-way power transmission through the planetary gearset. As soon as the clutch sleeve F is released, there will be free wheeling of the vehicle through the overrunning clutch J.

The vehicle may be speeded up to a speed above 15 M. P. H. and the sleeve F shifted back to direct drive position in response to momentary release of the accelerator pedal as described above. If the speed of the vehicle is allowed to fall below 7 M. P. H. as when coming to a stop, the governor mechanism G will close the switch 171 at approximately 7 M. P. H. to thereby connect the relay 314 to ground and cause the switch contacts 320, 321 to close energizing solenoid S' which in turn permits the spring 288 to close valve V' and vent motor N. As soon as motor N is vented, spring 251 will move the piston 247 rearwardly to disengage the lining 243 from the annulus gear 224 and engage the brake lining 244 with the brake member 245. The vehicle is now in low speed ratio and the above described cycle of operations may be repeated for further driving.

If, during drive in direct speed ratio, faster acceleration is desired than that available in this particular speed ratio, the kickdown function of the transmission may be resorted to. It is desired to point out at this point that with the particular transmission arrangement herein described, a relatively "fast" axle ratio in the order of 3.3 to 1 or 3 to 1 will preferably be used. Such an axle ratio gives good fuel economy and pleasing cruising performance.

The kickdown mechanism of the transmission is brought into operation by depression of the accelerator pedal 59 to wide open throttle position which action swings the lever 75 clockwise about its pivot 66, the finger 75 thereof engaging the switch operating finger 76 to close the switch 77. Closing of switch 77 connects the relay 314 to ground (the governor control switch 171 being open at cruising speeds) thereupon causing energization of solenoid S' and operation of valve V' to vent motor N. Venting of motor N immediately causes the spider 241 to be shifted rearwardly whereupon the rollers 236 of overrunning brake K engage to prevent reverse rotation of the sun gear 232. Locking of the sun gear against reverse rotation furnishes reaction for the planetary underdrive gearing and the vehicle will be immediately accelerated at increased speed and with increased torque under wide open throttle conditions and will continue to be driven in this speed ratio until the accelerator pedal is substantially released to idle position, it being noted that the finger 74 of the lever 75 is arranged in such manner that it will not engage the switch finger 76 until the accelerator pedal is returned to substantially engine idle position. This is to prevent undesired "hunting" of the under-drive mechanism.

Release of the accelerator pedal to the engine idling position will cause switch 77 to be opened and the transmission will be immediately returned to direct drive ratio through the action of the motor N. It should be noted that when the vehicle is operating in kickdown, the sleeve F remains clutched up in direct drive position and no free wheeling of the vehicle takes place, the brake lining 244 being effective to prevent forward rotational tendency of the spider 241 and sun gear 232 upon release of the accelerator pedal which will be accompanied by torque reversal through the transmission. The kickdown operation of the transmission and subsequent return to direct drive is accomplished without interrupting the ignition circuit of the engine as is a common feature of some other types of automatic transmissions.

If conditions are encountered where an extremely low driving ratio is desired as when pulling out of sand pits, snow, etc., the transmission may be shifted into emergency low range by manipulation of the manual sleeve H to clutch the teeth 122 thereof with the clutch teeth 115 of the gear 114. As soon as the shift yoke 123 is shifted rearwardly, the relatively high portion 135' of the rail 124 will thrust the ball 69 of the switch 68 upwardly to close this switch whereupon the solenoid S' will be energized and the valve V' will be closed. This in turn effects shift of the spider 214 to lock up the planetary gearset in underdrive. The direct sleeve F in the casing E, remains in its low speed position and the combination of ratios resulting from the planetary gearset being in underdrive and both sleeves F and H being in their low speed positions produces a satisfactory low driving ratio for the aforesaid purposes. It is to be noted that the reduction drive in the unit E is itself lower than that provided when the transmission is set for normal low speed ratio drive.

When the transmission is thus operating with the sleeves H and F in low range, the drive is transmitted from shaft 71 to shaft 83 at reduced speed ratio (the box D being in underdrive) and thence to gear 96 through over-running roller clutch J, gears 107 and 114, sleeve H and hub 120 to the shaft 93. The vehicle will remain in this driving ratio even though the governor mechanism reaches a speed sufficient to open the switch 171. This is because the rail switch 68 is closed and thus maintains the relay 314 energized. Energization of the relay 314 maintains the solenoid S' energized and valve V' closed to keep the planetary gearset in underdrive. The step-up in speed ratio may be obtained under these conditions by release of the accelerator pedal to permit forward shift of the sleeve F, this shift under these conditions taking place at approximately 7 M. P. H. instead of at 15 M. P. H. as occurs in high range. With the sleeve F in its direct position and the sleeve H in its low range position, the drive from the shaft 83 to shaft 93 is transmitted from pinion 90 through sleeve F to gear 109 thence through countershaft gears 106 and 107 to gear 114 which is clutched to the shaft 93 through the sleeve H. The planetary gearset is of course in underdrive.

The sleeve H may be shifted to direct position at the will of the driver by release of the clutch C and manipulation of the shift lever 173 as will be readily understood.

It may thus be seen that there are six available forward speed ratio drives, any one of which may be established by proper manipulation of the transmission controls. These are as follows:

| Ratio | Underdrive mechanism D | Sleeve F | Sleeve H |
|---|---|---|---|
| Emergency low (free wheeling) | Low | Low | Low. |
| Emergency second (non-free wheeling). | ...do | Direct | Do. |
| Normal low (free wheeling) | ...do | Low | Direct. |
| Normal second (free wheeling) | Direct | ...do | Do. |
| High (non-free wheeling) | ...do | Direct | Do. |
| Kickdown from high (non-free wheeling). | Low | ...do | Do. |

Reverse setting of the transmission is effected by depressing clutch pedal 84, lifting the lever 173 into its upper path of movement and swinging the lever in a counterclockwise direction to thereby engage the finger 133 in the slot 136 of the yoke 137 and move a reverse idler gear 117 rearwardly of the casing 89' to engage the same with the gears 108 and 119. The drive from the engine to the shaft 93 now takes place through the underdrive mechanism D which is in its low speed torque multiplying ratio and from the pinion 90 to the countershaft cluster 97 and thence through gears 108, 117 and 119, the latter gear, of course, being splined to the shaft 93. Step-up in speed ratio in reverse drive is obtained through the closing of the governor control switch 171 at a speed somewhere in the neighborhood of 5 M. P. H. as will be readily understood. In kickdown operation in reverse drive through manipulation of the accelerator pedal 59 to wide open throttle position is also obtainable although this will not ordinarily be resorted to under normal driving conditions.

Should it be desired to start the vehicle by towing or pushing the vehicle as is sometimes necessary when the battery is too low to turn the engine over, the switch 311 must be manipulated to open position. This switch is preferably located in some convenient spot on the instrument panel. When the switch 311 is opened, both solenoids S and S' will be deenergized and the springs 279 and 288 will move the plungers of the respective valves V and V' to open position. As soon as the vehicle attains sufficient speed for the pump P to furnish sufficient pressure to move the pistons 214 and 247, direct drive will immediately be established throughout the transmission. This is necessary to prevent free wheeling through the overrunning clutch J and to provide a more favorable speed ratio for reverse torque transmission through the underdrive mechanism D for starting the engine. As soon as the engine is started, the switch 311 may be closed and normal operating characteristics of the transmission control will be restored.

It will thus be seen that we have provided an exceptionally flexible and economically manufactured vehicle drive mechanism which is automatically operable under all normal driving conditions to provide the car speed ratio to suit all situations likely to be encountered yet which permits all of the various functions to be under the control of the driver. In addition, the transmission provides emergency low speed driving means which may be brought into operation by manipulation of the manual control lever in situations where extremely heavy torque is necessary.

The operation of the transmission with respect to the modification of the underdrive mechanism shown in Fig. 25 is identical to that described above so the description will not be repeated as it is deemed unnecessary.

While we have illustrated and described but two embodiments of our invention, it is to be understood that such are for the purpose of illustration only and it is contemplated that those skilled in the art may modify certain details without departing from the spirit or scope of the invention as defined in the claims appended hereto.

We claim:

1. In a power transmission for driving a motor vehicle having an engine, a driving shaft adapted to be driven by the engine; a driven shaft adapted to drive the vehicle; an intermediate shaft disposed between said driving and driven shafts; means for selectively driving said intermediate shaft from said driving shaft at the speed of the driving shaft and at a reduced speed relatively thereto; means for selectively driving said driven shaft from said intermediate shaft at the speed thereof and at a plurality of reduced speeds relatively thereto; means including selectively operable fluid pressure motors for controlling said driving means; a plurality of control means carried by the vehicle for controlling operation of said motors; said control means being constructed and arranged such that upon acceleration of the vehicle from rest, automatic step-up in speed ratio between said driving shaft and said intermediate shaft is effected at predetermined speed, and automatic step-up in speed ratio between said intermediate shaft and said driven shaft is effected when said vehicle is traveling at a relatively higher predetermined speed.

2. The combination set forth in claim 1 wherein means is provided controllable by the vehicle driver for regulating the speed at which said latter step-up in speed ratio takes place.

3. In a power transmission for driving a motor vehicle having an engine, a driving shaft adapted to be driven by the engine; a driven shaft adapted to drive the vehicle; an intermediate shaft disposed between said driving and driven shafts; means including a power operated clutch adapted for selective operation to establish a low-speed and a high-speed driving relationship between the driving shaft and intermediate shaft; means including a power operated clutch adapted for selective operation to establish a low-speed and a high-speed driving relationship between the intermediate shaft and the driven shaft; means including a manually operated clutch adapted for selective operation in conjunction with said last power operated clutch to establish an emergency low-speed and an emergency high-speed driving relationship between the intermediate shaft and the driven shaft, said emergency driving speed relationships being respectively lower in speed ratio than the aforesaid driving speed relationships obtained by operation of the power operated clutches alone.

4. In a power transmission for driving a motor vehicle having an engine, a driving shaft adapted to be driven by the engine; a driven shaft adapted to drive the vehicle; an intermediate shaft disposed between said driving and driven shafts; means including power operated clutch means adapted for selective operation to establish a low-speed and a high-speed driving relationship between the driving shaft and intermediate shaft;

means including power operated clutch means adapted for selective operation to establish a low-speed and a high-speed driving relationship between the intermediate shaft and the driven shaft; means including manually operated clutch means adapted for selective operation in conjunction with said last power operated clutch means to establish an emergency low-speed and an emergency high-speed driving relationship between the intermediate shaft and the driven shaft, said emergency driving speed relationships being respectively lower in speed ratio than the aforesaid driving speed relationships obtained by operation of the power operated clutch means alone; and means operable in response to operation of said manually operated clutch means into low-speed driving position for causing operation of the first named power operated clutch means to establish low-speed driving relation between the driving shaft and intermediate shaft.

5. In a power transmission including a planetary gear-set, an input shaft and an output shaft; an annulus gear on said input shaft; a planet gear carrier on said output shaft; a sun gear journalled on said output shaft for rotation relatively thereto; a drive control member carried by said sun gear and slidable relatively thereto, said drive control member having inner and outer friction elements non-rotatively fixed thereon; means on said annulus gear adapted to frictionally engage said inner friction surface for establishing 1 to 1 ratio drive through said gearset; stationary means adapted to frictionally engage said outer friction surface for establishing a torque multiplying drive through said gearset; means for shifting said drive control member including a fluid pressure motor having a piston adapted for movement by the pressure fluid to operatively engage said inner friction surface and spring means for operatively engaging said outer friction surface when said motor is vented; a plurality of control instrumentalities for controlling said motor including an electrically operated valve, a speed responsive switch for controlling said valve, and a manually operated switch for controlling said valve.

6. In a motor vehicle having an engine, a drive shaft adapted to be driven by the engine and a driven shaft adapted to drive the vehicle, reduction drive means for driving the driven shaft from the driving shaft at a reduced speed relatively thereto including step-up means operable automatically during drive of the vehicle in response to attainment of predetermined vehicle speed to step-up the driving speed ratio between said shafts; additional reduction drive means for driving the driven shaft from the driving shaft at a reduced speed relatively thereto adapted to operate in conjunction with said first reduction drive means and including step-up means operable by power means in response to momentary release of the drive of the vehicle at a predetermined vehicle speed that is higher than the speed at which said first step-up occurs to step-up the driving speed ratio between said shafts; and governor means responsive to vehicle speed for normally effecting operation of both said step-up means as aforesaid to establish a step-up in drive speed ratio in said drive means at a predetermined vehicle speed, and for actuating said step-up means at predetermined vehicle speeds to return said drive means to reduced speed drive 7. In a motor vehicle having an engine, a drive shaft adapted to be driven by the engine and a driven shaft adapted to drive the vehicle, reduction drive means for driving the driven shaft from the driving shaft at a reduced speed relatively thereto including step-up means operable automatically during drive of the vehicle in response to attainment of predetermined vehicle speed to step-up the driving speed ratio between said shafts; additional reduction drive means for driving the driven shaft from the driving shaft at a reduced speed relatively thereto adapted to operate in conjunction with said first reduction drive means and including step-up means operable by power means in response to momentary release of the drive of the vehicle at a predetermined vehicle speed that is higher than the speed at which said first step-up occurs to step-up the driving speed ratio between said shafts; governor means responsive to vehicle speed for controlling operation of both of said step-up means; and means operable any time at the will of the driver for controlling said first step-up means irrespective of said governor means whereby reduced speed drive may be reestablished at any time.

8. In a motor vehicle having an engine, a drive shaft adapted to be driven by the engine and a driven shaft adapted to drive the vehicle, reduction drive means for driving the driven shaft from the driving shaft at a reduced speed relatively thereto including step-up means operable automatically during drive of the vehicle in response to attainment of predetermined speed to step-up the driving speed ratio between said shafts; additional reduction drive means for driving the driven shaft from the driving shaft at a reduced speed relatively thereto adapted to operate in conjunction with said first reduction drive means and including step-up means operable by power means in response to momentary release of the drive of the vehicle at a predetermined speed that is higher than the speed at which said first step-up occurs to step-up the driving speed ratio between said shafts; fluid pressure motors for controlling said reduction drive means; a pump for supplying pressure fluid to said motors; electromagnetic means for controlling operation of said motors; and a plurality of control instrumentalities on said vehicle for controlling said electromagnetic means.

9. In a motor vehicle having an engine, a drive shaft adapted to be driven by the engine and a driven shaft adapted to drive the vehicle, reduction drive means for driving the driven shaft from the driving shaft at a reduced speed relatively thereto including step-up means operable automatically during drive of the vehicle in response to attainment of predetermined speed to step-up the driving speed ratio between said shafts; additional reduction drive means for driving the driven shaft from the driving shaft at a reduced speed relatively thereto adapted to operate in conjunction with said first reduction drive means and including step-up means operable by power means in response to momentary release of the drive of the vehicle at a predetermined speed that is higher than the speed at which said first step-up occurs to step-up the driving speed ratio between said shafts; fluid pressure motors for controlling said reduction drive means; a pump for supplying pressure fluid to said motors; solenoids for controlling operation of said motors so arranged with respect thereto that both said reduction drive means are in reduced speed drive condition when said solenoids are energized; and a switch adapted for operation by said pump for energizing said solenoids.

10. In a motor vehicle having an engine, a drive shaft adapted to be driven by the engine and a driven shaft adapted to drive the vehicle, reduction drive means for driving the driven shaft from the driving shaft at a reduced speed relatively thereto including step-up means operable automatically during drive of the vehicle in response to attainment of predetermined vehicle speed to step-up the driving speed ratio between said shafts; additional reduction drive means for driving the driven shaft from the driving shaft at a reduced speed relatively thereto adapted to operate in conjunction with said first reduction drive means and including step-up means operable by power means in response to momentary release of the drive of the vehicle at a predetermined vehicle speed that is higher than the speed at which said first step-up occurs to step-up the driving speed ratio between said shafts; a throttle control for said engine; and means operable in response to operation of said throttle control to wide-open throttle position at any time while said vehicle is traveling at a speed in excess of said first predetermined vehicle speed for causing said first reduction drive means to be returned to reduced speed drive condition.

11. In a power transmission for driving a motor vehicle having an engine; a speed ratio varying transmission for drivingly connecting the engine and vehicle driving wheels; transmission control means operable to control said transmission for step-up and step-down change in the speed ratio drive from the engine to the vehicle; a source of electrical power; electrically operated means for controlling operation of said transmission control means; and means including a fluid pump operably responsive to operation of the engine or said driving wheels independently of the engine for maintaining electrical power available to said electrically operated means from said source.

12. In a power transmission for driving a motor vehicle having an engine; a speed ratio varying transmission; transmission control means operable to control said transmission for step-up and step-down change in the speed ratio drive from the engine to the vehicle; a source of electrical power; electrically operated means for controlling operation of said transmission control means; a control circuit for said electrically operated means including governor means responsive to vehicle speed; switch means for energizing said circuit, and means operable independently of engine operation, responsive to all movement of said vehicle to close said switch and operable to open said switch when the vehicle is at rest.

13. In a power transmission for driving a motor vehicle having an engine; a speed ratio varying transmission; transmission control means operable to control said transmission for step-up and step-down change in the speed ratio drive from the engine to the vehicle; electrically operated means for controlling operation of said transmission control means; an ignition switch for controlling operation of the engine; a control circuit for said electrically operated means, said circuit including said ignition switch as an element thereof; and means operable independently of engine operation during movement of the vehicle for energizing said circuit independently of the ignition switch.

14. In a power transmission for driving a motor vehicle having an engine; a speed ratio varying transmission; transmission control means operable to control said transmission for step-up and step-down change in the speed ratio drive from the engine to the vehicle; electrically operated means for controlling operation of said transmission control means; an ignition switch for controlling operation of the engine; a control circuit for said electrically operated means including said ignition switch as an element thereof; a second switch connected in parallel with said ignition switch and means operable independently of engine operation in response to movement of the vehicle for closing said second switch.

15. In a power transmission for driving a motor vehicle having an engine; a speed ratio varying transmission; transmission control means operable to control said transmission for step-up and step-down change in the speed ratio drive from the engine to the vehicle; electrically operated means for controlling operation of said transmission control means; an ignition switch for controlling operation of the engine; a control circuit for said electrically operated means including said ignition switch as an element thereof; a second switch connected in parallel with said ignition switch and means operable only during movement of the vehicle and independently of engine operation for maintaining said second switch in closed position.

16. In a power transmission for driving a motor vehicle having an engine; a speed ratio varying transmission; transmission control means operable to control said transmission for step-up and step-down change in the speed ratio drive from the engine to the vehicle; electrically operated means for controlling operation of said transmission control means; an ignition switch for controlling operation of the engine; a control circuit for said electrically operated means including said ignition switch as an element thereof; a second switch connected in parallel with said ignition switch; a pump driven by the vehicle independently of the engine, and means operable in response to operation of said pump for closing said second switch.

17. In a power transmission for driving a motor vehicle having an engine and an ignition switch; a speed ratio varying transmission; transmission control means operable to control said transmission for step-up and step-down change in the speed ratio drive from the engine to the vehicle; electrically operated means under control of said ignition switch for controlling operation of said transmission control means; another switch normally open when the vehicle is at rest for controlling said electrically operated means, and means operable independently of the engine for closing said other switch in response to operation of the vehicle transmission mechanism, as the vehicle is being brought to a stop with the ignition switch open, whereby to facilitate continued operation of said electrically operated means until the vehicle is at rest.

18. In a motor vehicle having an ignition switch, an engine and drive wheels, a variable speed ratio transmission for connecting the engine and drive wheels, said transmission including an element adapted to be driven by both the engine and the drive wheels; transmission control means operable to control said transmission for varying the speed ratio drive; electrically operated means including a switch for controlling operation of said transmission control means; and means operably responsive to drive of said element by either said engine or said drive wheels for maintaining said electrically operated means electrically energized during movement of the vehicle with the ignition switch open or closed.

19. In a motor vehicle having an engine and drive wheels, a variable speed ratio transmission for connecting the engine and drive wheels, said transmission including a countershaft adapted to be driven by both the engine and drive wheels; a pump driven by said countershaft; transmission control means operable to control said transmission for varying the speed ratio thereof; electrically operated means for controlling operation of said transmission control means; and a switch adapted for operation by said pump for maintaining said electrically operated means electrically energized.

20. In a power transmission for driving a motor vehicle having an engine; shiftable means adapted for operation to vary the transmission driving ratio; a pressure fluid motor for controlling said shiftable means; electrically operated means for controlling said motor; a pump for supplying pressure fluid to said motor; a switch adapted when closed to energize said electrically operated means; means operably connecting said pump and switch for closing said switch in response to operation of said pump; means for driving said pump from the engine, and means for driving said pump from the vehicle drive wheels.

21. The combination set forth in claim 20 wherein means is provided operably responsive to predetermined vehicle driving speed for controlling energization of said electrically operated means in conjunction with said switch.

22. In a power transmission including a planetary gear-set, an input shaft and an output shaft; an annulus gear on said input shaft; a planet gear carried on said output shaft; a sun gear journaled on said output shaft for rotation relatively thereto; a drive control member carried by said sun gear and slidable relatively thereto, said drive control member having inner and outer friction elements non-rotatively fixed thereon; means on said annulus gear adapted to frictionally engage said inner friction surface for establishing 1 to 1 ratio drive through said gear-set; stationary means adapted to frictionally engage said outer friction surface for establishing a torque multiplying drive through said gearset; means for shifting said drive control member including a fluid pressure motor having an annular cylinder arranged concentrically about the axis of said shafts and an annular piston reciprocable in said cylinder for controlling said drive control member; a clutch surface carried by said sun gear; a clutch surface on said cylinder disposed in radial juxtaposition relatively to the first clutch surface, a plurality of rollers disposed between said surfaces and adapted to prevent reverse rotation of the sun gear, and an anti-friction bearing on said drive control member and supported in said piston.

23. In a motor vehicle having an engine, a drive shaft adapted to be driven by the engine and a driven shaft adapted to drive the vehicle, reduction drive means for driving the driven shaft from the driving shaft at a reduced speed relatively thereto including step-up means operable automatically during drive of the vehicle in response to attainment of predetermined vehicle speed to step-up the driving speed ratio between said shafts, additional reduction drive means for driving the driven shaft from the driving shaft at a reduced speed relatively thereto adapted to operate in conjunction with said first reduction drive means and including step-up means operable by power means in response to momentary release of the drive of the vehicle at a predetermined vehicle speed that is higher than the speed at which said first mentioned step-up occurs to step up the driving speed ratio between said shafts, power motor means operably connected to each of said reduction drive means for effecting said speed ratio changes therein, a source of power for said motor means, means for controlling said motor means and speed control means for controlling said motor controlling means.

24. In a power transmission for driving a motor vehicle having an engine, a pair of series arranged change speed mechanisms adapted to be driven by said engine, each of said mechanisms having an input member and an output member, one of said input members adapted to receive drive from the engine and to transmit drive through its change speed mechanism to the input member of the other of said pair of mechanisms, the output member of the other mechanism being adapted to drive the vehicle; one change speed mechanism comprising, means for driving the output member thereof from the input member thereof at a relatively slow speed driving ratio, means for driving said output member thereof from the input member thereof at a relatively faster speed driving ratio than that provided by said slow speed driving means, and means for automatically establishing said faster said speed ratio drive during drive of the vehicle at or above a predetermined speed thereof; the second change speed mechanism comprising, gear means, manual operated means adapted for selective operation to a high and a low speed range driving ratio setting of the gear means and power operated means adapted for selective operation in conjunction with said manual operated means to a high and a low speed range driving ratio setting of the gear means whereby to selectively establish a relatively slow speed ratio drive and a relatively faster speed ratio drive between the input and output members of the said second mechanism when said manual operated means is in said low speed range setting, and to selectively establish a relatively slow speed ratio drive and a relatively faster speed ratio drive between the said members of the said second mechanism when said manual operated means is in said high speed range setting, the said slow and fast drives established in said low speed range setting of said manual operated means being respectively slower than those established in said high speed range setting of said manual operated means; said transmission also having control means for automatically establishing said power operated means of the said second mechanism in its high speed range setting in response to vehicle coast at or above a predetermined vehicle speed which is relatively higher than that at which said fast speed ratio drive is established in said one change speed mechanism; and means operable to limit establishment of said fast speed ratio drive in the said one change speed mechanism to establishment of said manual operated means in the said second mechanism in its high range setting.

25. In a power transmission for driving a motor vehicle having an engine, a pair of series arranged change speed mechanisms adapted to be driven by said engine, each of said mechanisms having an input member and an output member, one of said input members adapted to receive drive from the engine and to transmit drive through its change speed mechanism to the input member of the other of said pair of mechanisms, the output member of the other mechanism being adapted to drive the vehicle; one change speed mechanism comprising, means for driving the output member thereof from the input member thereof at a relatively slow speed driving ratio, means for driving said output member thereof from the input member thereof at a relatively faster speed driving ratio than that provided by said slow speed driving means, and means for automatically establishing said faster speed ratio drive during drive of the vehicle at or above a predetermined speed thereof; the second change speed mechanism comprising, gear means, manual operated means adapted for selective operation to a high and a low speed range driving ratio setting of the gear means and power operated means adapted for selective operation in conjunction with said manual operated means to a high and a low speed range driving ratio setting of the gear means whereby to selectively establish a relatively slow speed ratio drive and a relatively faster speed ratio drive between the input and output members of the said second mechanism when said manual operated means is in said low speed range setting, and to selectively establish a relatively slow speed ratio drive and a relatively faster speed ratio drive between the said members of the said second mechanism when said manual operated means is in said high speed range setting, the said slow and fast drives established in said low speed range setting of said manual operated means being respectively slower than those established in said high speed range setting of said manual operated means; said transmission also having control means for automatically establishing said power operated means of the said second mechanism in its high speed range setting in response to vehicle coast at or above a predetermined vehicle speed which is relatively higher than that at which said fast speed ratio drive is established in said one change speed mechanism, means operable to limit establishment of said fast speed ratio drive in the said one change speed mechanism to establishment of said manual operated means in the said second mechanism in its high range setting; and means operable at the will of the driver for automatically stepping down the said fast speed ratio drive established in the said one change speed mechanism during establishment of said manual operated means and power operated means respectively of the said other change speed mechanism in their high speed range settings.

26. In a drive for a motor vehicle having an engine; a transmission operable to provide a plurality of drives of differing speed ratio for driving the vehicle from the engine, comprising series arranged change speed mechanisms drivingly connecting the engine and vehicle, one change speed mechanism having planetary means adapted to be arranged to establish a relatively slow speed ratio drive therein and having power operated means for arranging said planetary means to establish a relatively faster speed ratio drive therein; another change speed mechanism including a plurality of gear means, shiftable means normally arranged in position when starting the vehicle from rest to establish a certain group of said gear means in a relatively slow speed ratio drive, power operated means for shifting said shiftable means to establish said certain group of gear means in a relatively faster speed ratio drive, and manual operated means shiftable from a neutral position to selectively establish a relatively slow speed ratio drive in another group of said gear means and a relatively faster speed ratio drive in said group; control means operable to actuate said power operated means in the said one mechanism during drive of the vehicle at or above a predetermined speed thereof for automatically establishing said faster speed ratio drive in said planetary means; control means operable to actuate said power operated means in the said other mechanism in response to vehicle coast at or above a predetermined vehicle speed which is relatively higher than that at which said power operated means is actuated in the said one mechanism, for establishing the said faster said speed ratio drive in said certain group of gear means of the said other mechanism; and means limiting establishment of said faster speed ratio drive in said planetary means of the said one mechanism to establishment of said slow speed ratio drive in said other group of gear means of the said other mechanism by said manual operated means and permitting establishment of said faster speed ratio drive in said certain group of gear means of the said other mechanism upon establishment of either said relatively slow or said relatively faster speed ratio drives by said manual operated means in the said other group of gear means therein.

27. In a power transmission for driving a motor vehicle having an engine, gear means, manual operated clutch means shiftable from a neutral position to selectively establish a relatively slow speed ratio drive arrangement and a relatively fast speed ratio drive arrangement of said gear means, a plurality of power operated means operable in conjunction with said manual operated means for stepping up said speed ratio drives, one of said power operated means being operable to automatically step-up the speed ratio drive of said gear means upon vehicle coast when said clutch means is positioned to establish said relatively slow speed ratio drive in said gear means, another of said power operated means being operable to automatically step-up the speed ratio drive of said gear means during drive of the vehicle when said clutch means is positioned to establish said relatively faster speed ratio drive in said gear means and means limiting establishment of said step-up during drive of the vehicle to positioning of said manual operated means to said relatively fast speed ratio drive position.

AUGUSTIN J. SYROVY.
WILLIAM T. DUNN.
OTTO W. SCHOTZ.